United States Patent
Yang et al.

(10) Patent No.: US 11,189,445 B2
(45) Date of Patent: Nov. 30, 2021

(54) JOG DIAL TYPE OPERATION SWITCH AND SINK CABINET DEVICE COMPRISING SAME

(71) Applicant: LG ELECTRONICS INC., Seoul (KR)

(72) Inventors: Inhyung Yang, Seoul (KR); Seongho Kim, Seoul (KR); Jong Seok Kim, Seoul (KR); Daeyun Park, Seoul (KR); Ung Je Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/754,520

(22) PCT Filed: Oct. 17, 2018

(86) PCT No.: PCT/KR2018/012299
§ 371 (c)(1),
(2) Date: Apr. 8, 2020

(87) PCT Pub. No.: WO2019/078627
PCT Pub. Date: Apr. 25, 2019

(65) Prior Publication Data
US 2020/0350129 A1    Nov. 5, 2020

(30) Foreign Application Priority Data

Oct. 17, 2017  (KR) .................. 10-2017-0134651
Oct. 24, 2017  (KR) .................. 10-2017-0138613
(Continued)

(51) Int. Cl.
*H01H 19/14*     (2006.01)
*A47B 81/00*    (2006.01)
(Continued)

(52) U.S. Cl.
CPC ............. *H01H 19/14* (2013.01); *A47B 81/00* (2013.01); *E03C 1/182* (2013.01); *E03C 1/326* (2013.01);
(Continued)

(58) Field of Classification Search
CPC ........ H01H 19/14; H01H 19/06; A47B 81/00; E03C 1/182; E03C 1/326; F21S 10/02; F21V 19/0015; F21V 23/003
See application file for complete search history.

(56) References Cited

U.S. PATENT DOCUMENTS

2010/0052938 A1   3/2010  Otsuka et al.
2011/0164418 A1   7/2011  Kaneda et al.
(Continued)

FOREIGN PATENT DOCUMENTS

CN    202235005 U    5/2012
JP    2010-000338 A  1/2010
(Continued)

OTHER PUBLICATIONS

Extended European Search Report received in PCT/KR2018012299, dated Jun. 23, 2021 (8 pages).

*Primary Examiner* — Mary Ellen Bowman
(74) *Attorney, Agent, or Firm* — Finnegan, Henderson, Farabow, Garrett & Dunner LLP

(57) ABSTRACT

A dial type operation switch comprises: an upper assembly including a display device; a lower assembly including an encoder; and a wheel assembly which rotates while surrounding the sides of the upper assembly and the lower assembly. Further, a knob switch comprises a push switch which is operated by pressing the display device in multiple directions, whereby a structure capable of various settings and operations is provided by combining the push switch with the rotation of the wheel assembly. In addition, a sink
(Continued)

cabinet device comprises a bath sink and a functional module, wherein a bath sink lamp is provided and operation states of the sink cabinet device can be displayed using the bath sink lamp. Therefore, there is provided a structure in which the bath sink lamp can be used as a mood lamp for improving the beauty of a bathroom.

20 Claims, 25 Drawing Sheets

(30) Foreign Application Priority Data

| | | | |
|---|---|---|---|
| Nov. 20, 2017 | (KR) | ......................... | 10-2017-0155155 |
| Nov. 20, 2017 | (KR) | ......................... | 10-2017-0155157 |
| Nov. 22, 2017 | (KR) | ......................... | 10-2017-0156799 |

(51) Int. Cl.

| | |
|---|---|
| *E03C 1/182* | (2006.01) |
| *E03C 1/326* | (2006.01) |
| *F21S 10/02* | (2006.01) |
| *F21V 19/00* | (2006.01) |
| *F21V 23/00* | (2015.01) |
| *H01H 19/06* | (2006.01) |
| *F21Y 103/33* | (2016.01) |
| *F21Y 115/10* | (2016.01) |
| *E03C 1/04* | (2006.01) |
| *F21V 3/00* | (2015.01) |

(52) U.S. Cl.
CPC .......... *F21S 10/02* (2013.01); *F21V 19/0015* (2013.01); *F21V 23/003* (2013.01); *H01H 19/06* (2013.01); *A47B 2220/0077* (2013.01); *A47B 2220/03* (2013.01); *E03C 2001/0418* (2013.01); *F21V 3/00* (2013.01); *F21Y 2103/33* (2016.08); *F21Y 2115/10* (2016.08)

(56) References Cited

U.S. PATENT DOCUMENTS

| | | |
|---|---|---|
| 2013/0345883 A1 | 12/2013 | Sloo et al. |
| 2016/0189896 A1* | 6/2016 | Lee ..................... H03K 17/968 |
| | | 200/313 |
| 2017/0163437 A1 | 6/2017 | Yang et al. |
| 2020/0110492 A1 | 4/2020 | Sun |

FOREIGN PATENT DOCUMENTS

| | | |
|---|---|---|
| JP | 2013-109830 A | 6/2013 |
| KR | 20-0318339 Y1 | 6/2003 |
| KR | 10-1155221 B1 | 6/2012 |
| KR | 101501141 B1 | 3/2015 |

* cited by examiner

FIG. 1
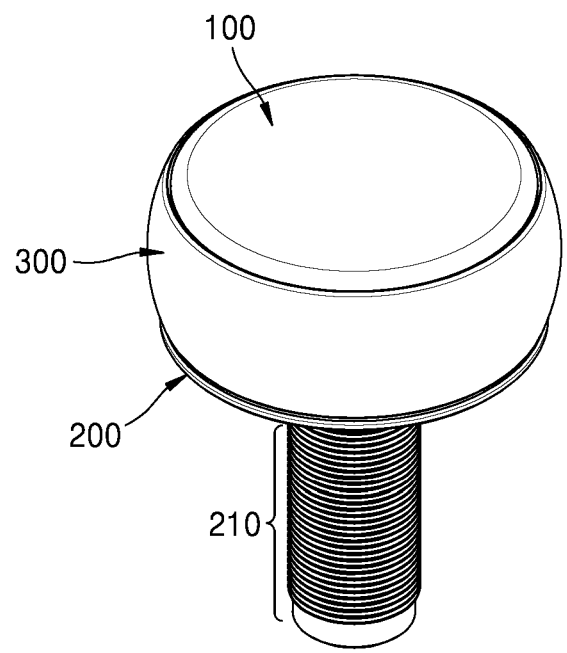
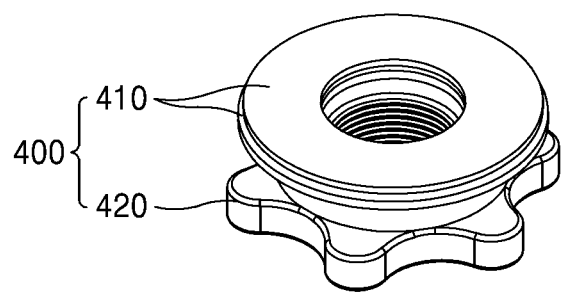

FIG. 3
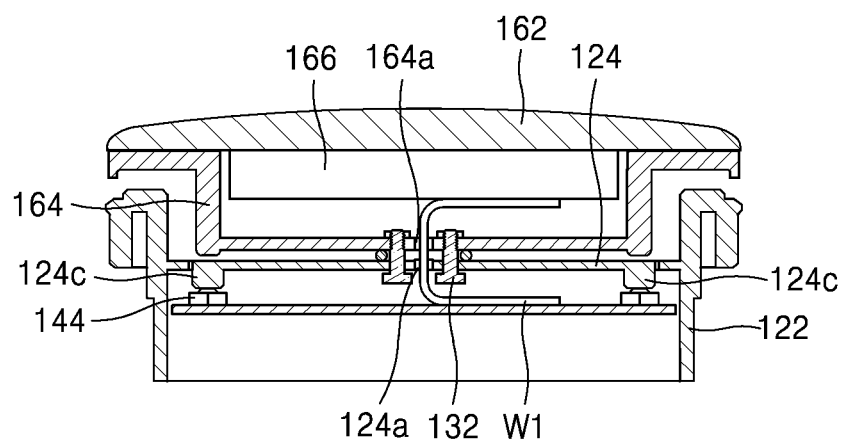
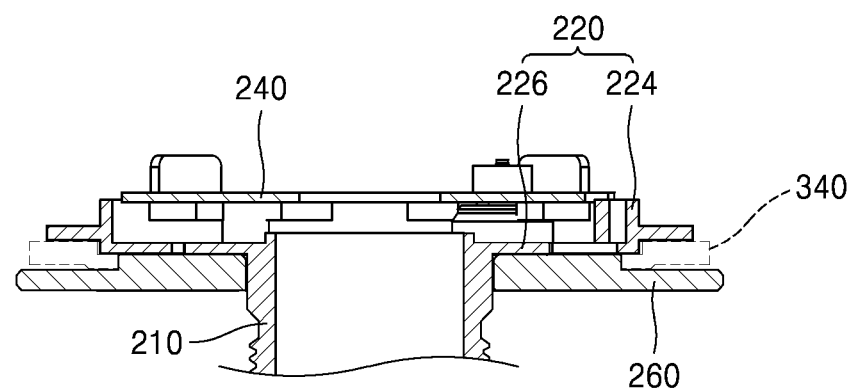
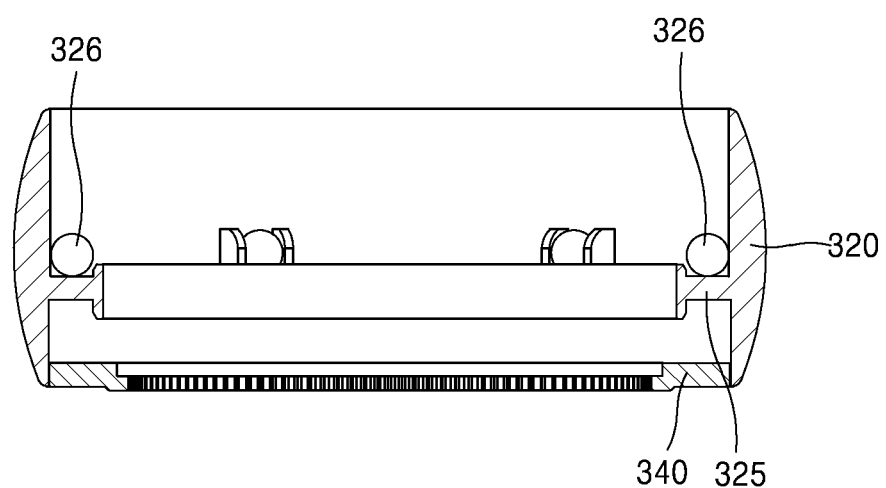

FIG. 17
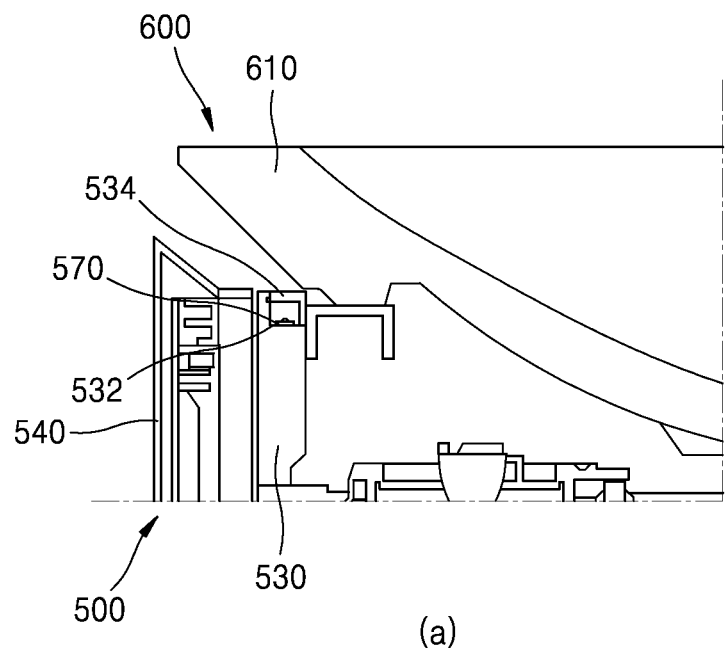
(a)
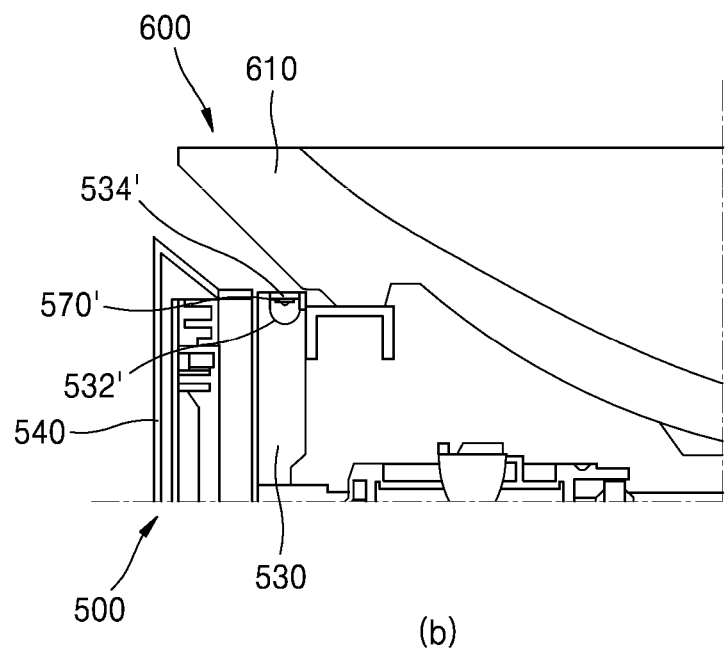
(b)

FIG. 19
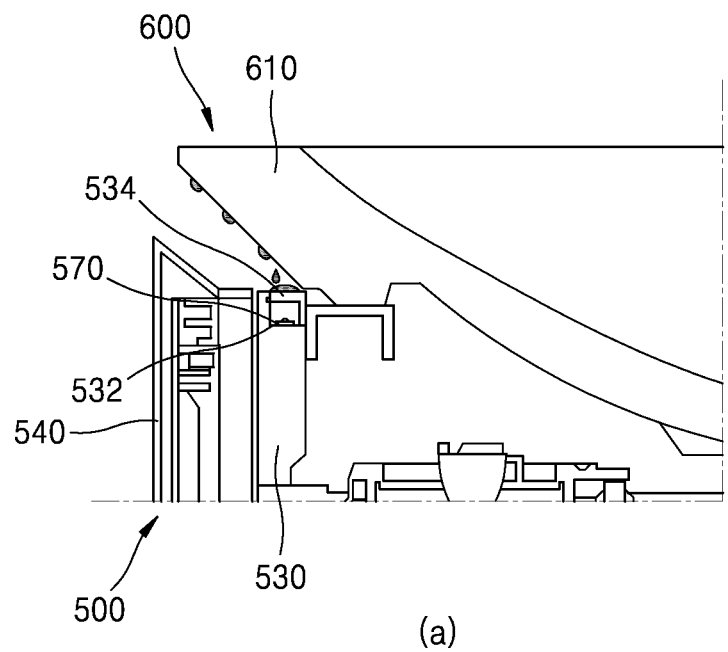
(a)
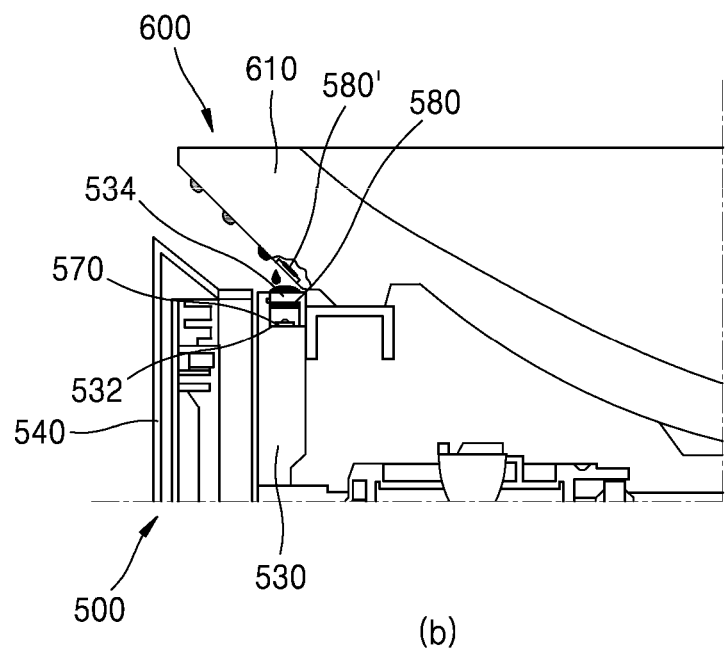
(b)

JOG DIAL TYPE OPERATION SWITCH AND SINK CABINET DEVICE COMPRISING SAME

TECHNICAL FIELD

The present disclosure relates to a jog dial type operation switch, and more particularly, to a jog dial type operation switch applicable to an environment in which water is used such as a bathroom or a kitchen, and a sink cabinet device including the same.

BACKGROUND

Various types of convenience products such as electric toothbrushes, electric shavers, and hair dryers may be used in bathroom spaces in which bath sinks, bathtubs, and shower booths are disposed. Examples of bathroom furniture may include a mirror cabinet attached to the wall and a sink cabinet including a bath sink.

Bathroom furniture and convenience apparatuses used in bathrooms have been considered as separate components. Electrical appliances may be powered through power outlets provided on the bathroom walls and stored in the bathroom furniture.

As various types of home appliances used in bathrooms are provided, bathroom furniture including embedded power outlet is introduced, but multi-taps may only be embedded in and installed in the bathroom furniture.

The present disclosure provides a jog dial type operation switch that operates various types of convenience apparatuses used in bathrooms and bathroom furniture.

Water supply devices may be installed in kitchen counters, bath sinks, bathtubs, and the like, to supply water or block the water supply. Water supply devices discharge the water by controlling a flow rate, a flow velocity, and a temperature of water supplied by opening and closing a flow path using a lever and a button disposed on a body connected to a water supply pipe.

Faucets may include various types of faucets, for example, a faucet connected to one water supply pipe to supply cold water or hot water, a faucet connected to two water supply pipes to supply cold water and hot water, and a faucet in which a water discharge pipe is installed and connected to a shower.

Faucets may be classified into lever type faucets, button type faucets, or rotary type faucets according to operation methods and faucets may be made of various types of materials, for example, steel, copper alloy or stainless according to usage and installation places.

The faucets are connected to the water supply pipe buried in places in which water may be supplied, such as home or public places, and control a temperature, the flow rate, and the flow velocity of the water supplied by the operation of the lever such that the faucets discharge the water.

However, generally used faucet may not immediately discharge the water at a desired temperature because the temperature of hot water supplied from the hot water pipe is not constant or the hot water in the hot water pipe cools down after a predetermined period of time during which the hot water is not discharged.

Therefore, users use the hot water by adjusting the temperature of the water by rotating a control lever directly or use the water after flowing the water down until the hot water cooled down in the hot water pipe is all discharged. The users may got burnt when the lever is suddenly operated in the case of the former and the user may flow the water down without using the cooled water in the case of the latter, which results in waste of water.

SUMMARY

Technical Problem

The present disclosure provides a jog dial type operation switch that allows water to be discharged by natural drainage even if the water is introduced into the operation switch.

The present disclosure also provides a jog dial type operation switch that selects and operates various types of control target devices using a single operation switch.

The present disclosure further provides a sink cabinet device that may determine a use state through visual effects (e.g., changes in colors of a lamp) and having improved aesthetic qualities to change indoor atmosphere.

The present disclosure further provides a sink cabinet device including a lamp on a bath sink such that users may determine an operation state of the sink cabinet device through the visual effects obtained using the lamp.

The present disclosure further provides a sink cabinet device capable of removing moisture such as water flowing out of the bath sink.

Technical Solution

According to the present disclosure, a jog dial type operation switch may include an upper assembly including a display device, a lower assembly including an encoder, and a wheel assembly which rotates while surrounding sides of the upper assembly and the lower assembly. According to the present disclosure, the operation switch may enable water to naturally flow even when the water permeates into a gap between the upper assembly and the wheel assembly.

According to the present disclosure, the jog dial type operation switch may be operated by pressing the display device in multiple directions and may be operated by rotating the wheel assembly to display, to the display device, a combination of a pressing operation with a rotation operation such that the user may variously set and operate.

According to the present disclosure, the sink cabinet device includes a bath sink including a faucet, a sink cabinet body disposed below the bath sink and that accommodates a functional module, and a lamp disposed at one side of an upper end of the cabinet body and that controls colors to be changed in association with operation of the functional module. According to the present disclosure, the sink cabinet device may further include a heating member disposed at an upper end of the cabinet body and that heats and dries the water flowing down from the bath sink.

According to the present disclosure, the sink cabinet device may include a bath sink, a functional module, and a bath sink lamp and may display the operation state of the sink cabinet device using the bath sink lamp and may be used as a mood lamp to improve beauty of the bathroom. In order to implement the bath sink lamp, the bath sink body is made of a light-transmitting material and defines a lamp installation groove to install light sources around the drain pipe.

According to the present disclosure, the water supply device of the faucet may include a cold water control valve disposed in a cold water supply pipe connected to a discharge pipe, a hot water control valve disposed in a hot water supply pipe connected to the discharge pipe, a temperature sensing sensor that senses the temperature of the water discharged through the discharge pipe, an operator that receives information on a set temperature and an amount of discharged water, each of a first lamp and a second lamp including at least two colors of light sources and that changes the colors of the emitted light, and a controller that controls an opening rate of each of the cold water control valve and the hot water control valve based on the set temperature input to the operator, controls a color of the first lamp based on the set temperature input to the operator, and controls a color of the second lamp based on the temperature of the discharged water, which is sensed by the temperature sensing sensor. In this case, the jog dial type operation switch may be used as the operator.

Each of the first lamp and the second lamp may preferably include a blue light source and a red light source, the first lamp may be disposed in the operation switch, or disposed adjacent to the operation switch, and the second lamp may be disposed around a drain valve.

In some cases where the water supply device is used for the shower booth, the second lamp may be disposed on the wall or a ceiling surface of the shower booth or may be disposed on a shower head.

According to the present disclosure, the water supply device may include a buffer tank connected to a cold water supply pipe, a hot water supply pipe, and an water discharge pipe; a cold water control valve disposed in the cold water supply pipe; a hot water control valve disposed in the hot water supply pipe; a water discharge control valve disposed in the water discharge pipe; a temperature sensing sensor that measures a temperature of water in the buffer tank; a heater that heats the water stored in the buffer tank; an operator that receives information on a set temperature and an amount of discharged water; a first lamp including at least two colors of light sources and that changes a color of the emitted light; a second lamp including at least two colors of light sources and that changes a color of the emitted light; and a controller that controls opening and closing of the cold water control valve and the hot water control valve according to the set temperature input to the operator, controls the color of the first lamp based on the set temperature, and controls the color of the second lamp based on the temperature of the discharged water, which is detected by the temperature sensing sensor.

The controller may preferably operate the heater in a state in which the water discharge control valve is closed, when a difference between the set temperature input to the operator and a measured temperature detected by the temperature sensing sensor deviates from a predetermined temperature value range.

Further, the controller may preferably correct the opening rate of the cold water control valve and the opening rate of the hot water control valve when the difference between the set temperature input to the operator and the measured temperature sensed by the temperature sensing sensor deviates from a predetermined deviation range after a predetermined period of time.

Advantageous Effects

According to the present disclosure, an operation switch has an effect of selecting an operation to be operated by pressing a display device on an upper surface of the operation switch and quickly adjusting a desired degree by rotating a wheel assembly. A light may also be illuminated at a lower portion of the wheel assembly such that users may intuitively determine an operation state thereof through the lamp.

According to the present disclosure, users may easily and conveniently operate various settings and operations using a single switch, thereby improving user convenience.

According to the present disclosure, in the sink cabinet device, a color of the lamp is changed according to a use state such that the user may easily determine the use state, may determine whether operation is properly performed without checking the operation switch, and the sink cabinet device may change the indoor atmosphere, thereby improving aesthetic qualities and satisfying emotional qualities.

According to the present disclosure, the sink cabinet device may quickly dry the water flowing out of the bath sink when the bath sink is used, to minimize generation of contamination of surrounding environment and to prevent growth of microorganisms such as mold due to residual moisture, thereby resulting in a clean indoor environment.

According to the present disclosure, the sink cabinet device has an effect of allowing the user to intuitively determine the operation state of the sink cabinet device by changing the light source embedded in the bath sink to various colors or brightness according to the operation state or the use state thereof.

According to the present disclosure, the sink cabinet device includes the bath sink made of a light-transmitting material and embeds the light source around a drain hole of the bath sink, and enables the bath sink to softly diffuse the light emitted from the light source when the light source is illuminated, such that the bath sink functions as a mood lamp at a central portion of a bathroom space.

According to the present disclosure, the water supply device of the faucet may visually display a set temperature desired by the user and a temperature of the water discharged through the discharge pipe, thereby improving user convenience.

According to the present disclosure, the water supply device of the faucet may not discharge the water, if the set temperature desired by the user is significantly different from the temperature of the water discharged through the water discharge pipe, and may discharge the water after heating the water by a heater, thereby reducing waste of water.

According to the present disclosure, the water supply device of the faucet may sense the temperature of the discharged water in real time and compare it with the set temperature, and may correct the opening rate of each of the cold water control valve and the hot water control valve, thereby improving user convenience.

BRIEF DESCRIPTION OF DRAWINGS

FIG. 1 is a perspective view showing a jog dial type operation switch according to an embodiment of the present disclosure.

FIG. 3 is a cross-sectional view of a jog dial type operation switch in an assembly unit according to an embodiment of the present disclosure.

FIG. 17 is an enlarged cross-sectional view of a lamp of a sink cabinet device according to an embodiment of the present disclosure.

FIG. 19 is a cross-sectional view of a heating member that dries water flowing out of a bath sink of a sink cabinet device according to an embodiment of the present disclosure.

DETAILED DESCRIPTION

Figure 2:
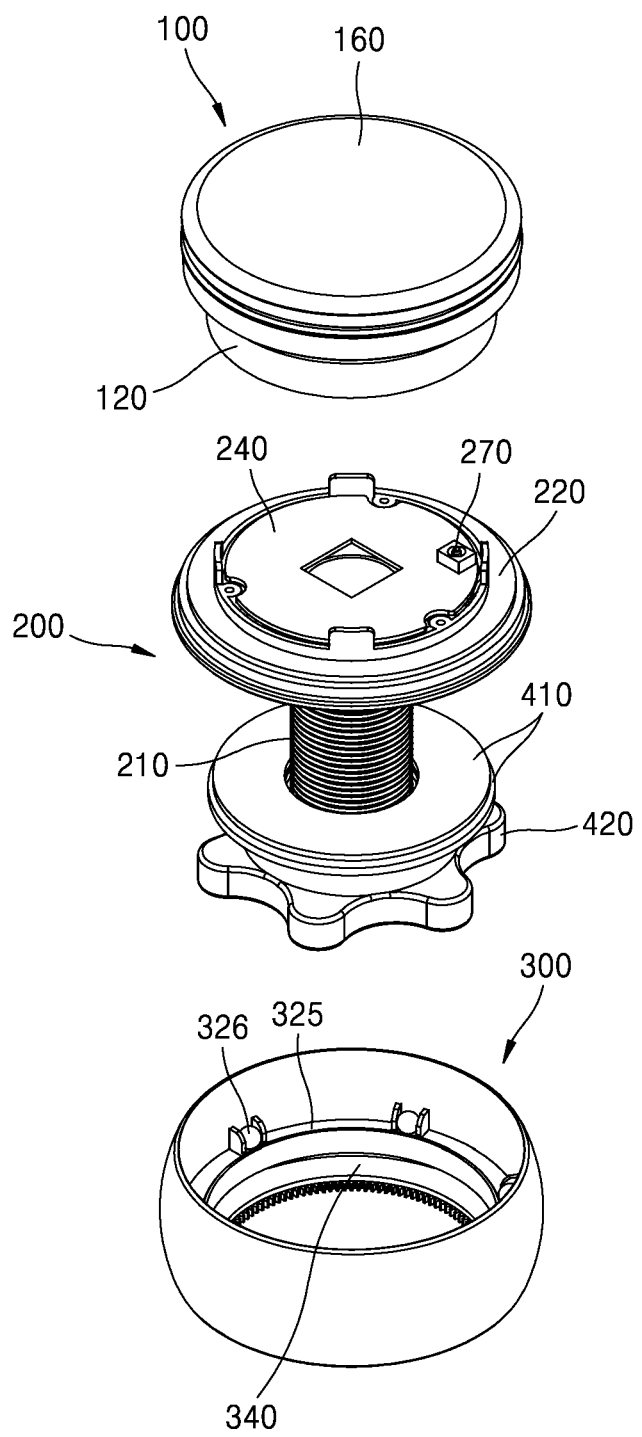
FIG. 2 is an exploded perspective view showing a jog dial type operation switch which is separated into assembly units according to an embodiment of the present disclosure.

The above-mentioned objects, features, and advantages of the present disclosure will be described in detail with reference to the accompanying drawings, so that a person having ordinary skill in the art to which the present disclosure pertains may easily implement the technical idea of the present disclosure. A detailed description of a well-known technology relating to the present disclosure may be omitted if it unnecessarily obscures the gist of the present disclosure.

Preferable embodiments of the present disclosure will be described below in detail with reference to the accompanying drawings. Same reference numerals in the drawings are used to indicate same or similar components.

Hereinafter, when any component is arranged at "an upper portion (or a lower portion)" of the component or "on (or under)" of the component, any component may be arranged in contact with an upper surface (or a lower surface) of the component, and another component may be interposed between the component and any component arranged on (or under) the component.

When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

A jog dial type operation switch according to an embodiment of the present disclosure is described below in detail with reference to accompanying drawings.

FIG. 1 is a perspective view showing a jog dial type operation switch according to an embodiment of the present disclosure. FIG. 2 is an exploded perspective view showing a jog dial type operation switch in assembly units according to an embodiment of the present disclosure. FIG. 3 is a cross-sectional view of a jog dial type operation switch in assembly units according to an embodiment of the present disclosure.

As shown, according to an embodiment of the present disclosure, a jog dial type operation switch 10 includes an upper assembly 100, a lower assembly 200, and a wheel assembly 300. The upper assembly 100, the lower assembly 200, and the wheel assembly 300 are coupled to one another.

The lower assembly 200 includes a hollow shaft 210 and fastening members 400 may be fastened to the hollow shaft 210 to fix the operation switch 10 to an upper plate of the sink cabinet. A sealing washer 410 and a fastening nut 420 may be used as examples of the fastening member 400.

After defining, on the upper plate of the cabinet, a through-hole into which the hollow shaft 210 may be inserted, the user may fasten using the fastening nut 420 in a state in which the sealing washers 410 contact both surfaces of the upper plate of the cabinet. The sealing washer 410 functions to block between the hollow shaft 210 and the through hole.

The upper assembly 100 includes an upper body 120, an upper substrate 140, and a display device 160. The display device 160 includes a cover glass 162, a display housing 164, and a panel 166 accommodated therebetween.

The lower assembly 200 includes a lower body 220 including a hollow shaft 210, a lower substrate 240, and a finishing plate 260. An encoder 270 is disposed on the encoder 270 to detect a rotation operation of the wheel assembly 300.

The wheel assembly 300 includes a cylindrical wheel body 320 and a ring gear 340 fixed to a bottom of the wheel body 320 and engaged with the encoder 270.

Figure 4:
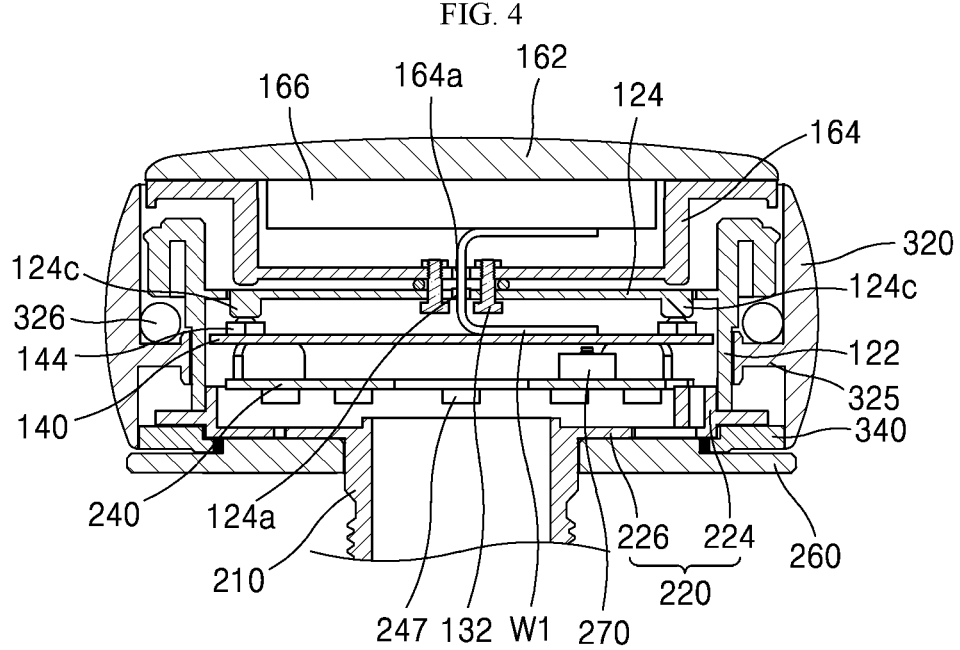
FIG. 4 is a coupling cross-sectional view of a jog dial type operation switch according to an embodiment of the present disclosure.
Figure 5:
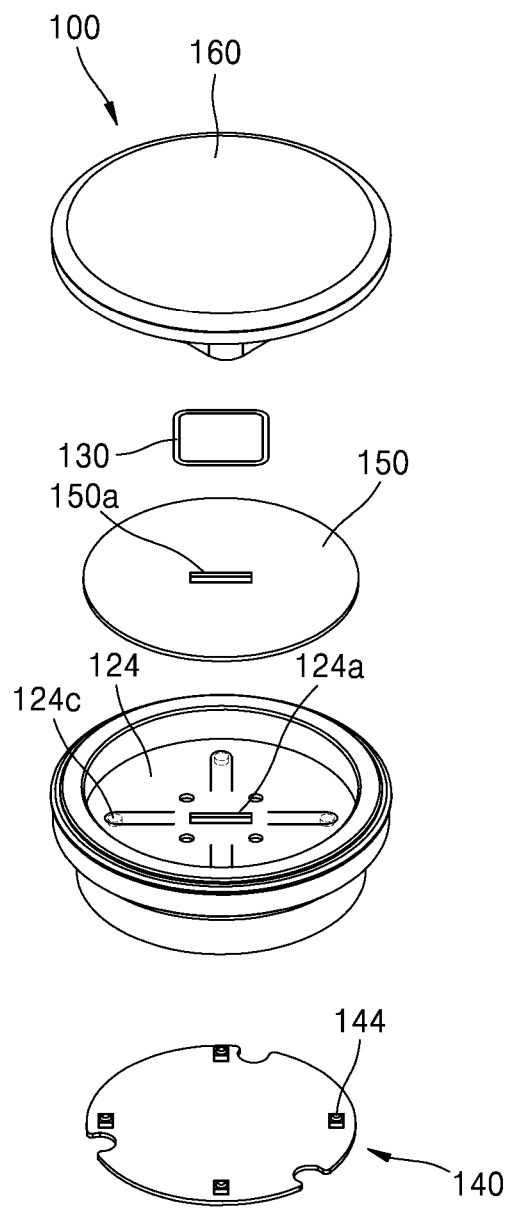
FIG. 5 is an exploded perspective view showing an upper assembly of a jog dial type operation switch according to an embodiment of the present disclosure.

FIG. 4 is a coupling cross-sectional view of a jog dial type operation switch according to an embodiment of the present disclosure. FIG. 5 is an exploded perspective view showing an upper assembly of a jog dial type operation switch according to an embodiment of the present disclosure.

An upper assembly 100 is described below in detail with reference to FIGS. 4 and 5.

An upper surface of the upper assembly 100 is only exposed in appearance and a display device 160 is disposed thereon.

The display device 160 may display a state of an operation switch or types and states of control target devices operated by the operation switch.

The display device 160 includes a cover glass 162, a display housing 164, and a panel 166 including a display panel and a circuit that drives the display panel.

The panel 166 is blocked between the cover glass 162 and the display housing 164. A wire 168 connected to the panel 166 is drawn out through a wire hole 164a at a center of a bottom surface of the display housing 164 and the wire drawn through the wire hole 164a is connected to the upper substrate 140.

The upper body 120 has an approximately H-shaped cross-section. For example, the upper body 120 includes a cylindrical outer circumferential plate 122 and a support plate 124 crossing the outer circumferential plate 122.

The support plate 124 defines a wire hole 124a into which the wire 168 of the display is inserted. The support plate 124 is also coupled to a lower body 220 described below.

The upper substrate 140 is coupled below the support plate 124 of the upper body. A plurality of push switches 144 are arranged on the upper substrate 140. The push switch 144 is pressed by a movable protrusion 124c that protrudes from the support plate 124.

An elastic sheet 150 may be stacked on the support plate 124. The elastic sheet 150 has an effect of blocking the permeation of moisture to a lower portion of the support plate (e.g., a space where the upper substrate is disposed).

The elastic sheet 150 also has an effect of providing a restoring force of the movable protrusion 124c when a periphery of the movable protrusion 124c is cut.

An elastic jacket 130 may be disposed between the display device 160 and the support plate 124 of the upper body 120. The elastic jacket 130 has a polygonal shape and is preferably disposed such that one side of the elastic jacket 130 may be uniformly pressed when one push switch 144 is pressed.

For example, one side of the elastic jacket 130 is compressed when the push switch 144 is pressed, such that the restoring force of the elastic jacket 130 acts as a restoring force of the display device 160.

Figure 8:
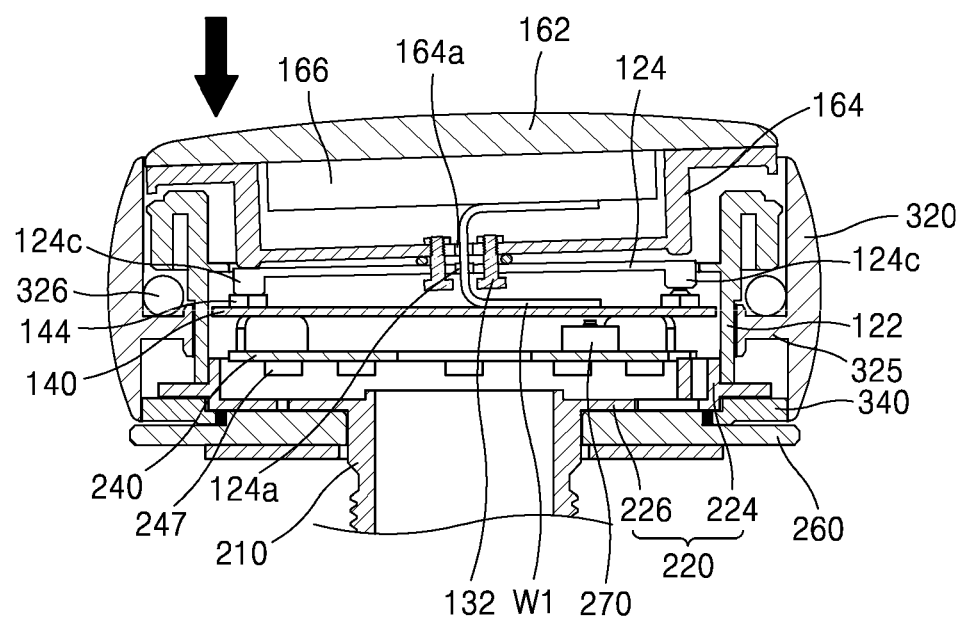
FIGS. 8 and 9 respectively show selection operation of an upper assembly of a jog dial type operation switch according to an embodiment of the present disclosure.
Figure 9:
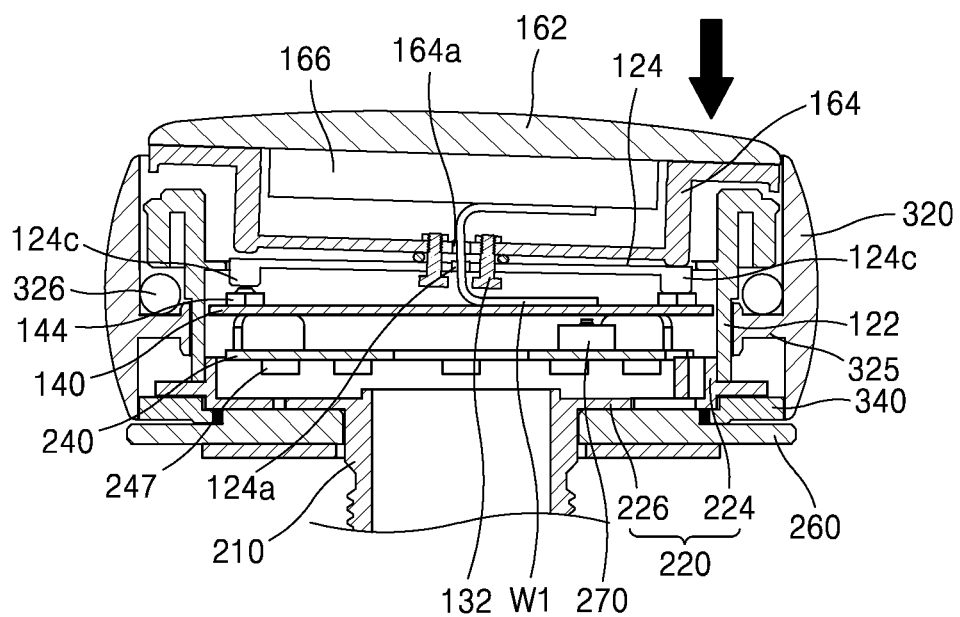

FIGS. 8 and 9 respectively show a selection operation of an upper assembly of a jog dial type operation switch according to an embodiment of the present disclosure.

An upper portion of a movable protrusion 124c contacts a display device 160 and a lower portion of the movable protrusion 124c contacts a push switch 144. When the user presses the display device 160 in a specific direction, the display rotates and the push switch 144 is pressed.

In the illustrated embodiment, the push switch 144 has a cross shape such that the display device may be pressed in a cross direction, but a number and arrangement of the push switches 144 may be variously changed. In order to smoothly move the movable protrusion 124c, a periphery of the movable protrusion 124c may be partially cut into a U-shape or the like. The cut-away shape may be variously changed.

In this case, the elastic sheet 150 may be stacked in order to prevent moisture from permeating into the cutaway. In this case, the elastic sheet 150 may include an adhesive surface and may be attached to an upper surface of a lower surface of the support plate 124.

The elastic sheet 150 functions to prevent permeation of moisture and also improves the restoring force of the movable protrusion 124c. The elastic sheet 150 defines a wire hole 150a at a central region thereof such that a wire W1 of the display device 160 I inserted thereto.

The display device 160 may be preferably coupled such that a central portion may be moved relative to the display housing 164 of the upper body 120.

To this end, as shown in FIG. 4, a fastening bolt 132 may be fastened to the display housing 164 at a bottom surface of the support plate 124 of the upper body 120. In this case, the fastening bolt is preferably fastened to the display housing 164 and preferably penetrates the support plate 124.

This configuration enables the display device 160 to be rotatable relative the upper body 120 and enables the push switch 144 disposed on the upper substrate 140 to be operated by pressing the display device 160.

In this case, the upper assembly 100 may further include a cylindrical elastic jacket 130 that surrounds a periphery of the fastening bolt 132. The elastic jacket 130 is fixed between the display housing 164 and the support plate 145 to provide the restoring force when the display housing 164 rotates.

The elastic jacket 130 also functions as a watertight cover to prevent permeation of moisture into the elastic jacket 130. As shown, as the wire of the display device 160 passes through an inside of the elastic jacket 130, the water may be further prevented from permeating into the wire of the display device 160 due to the elastic jacket 1.

Figure 6:
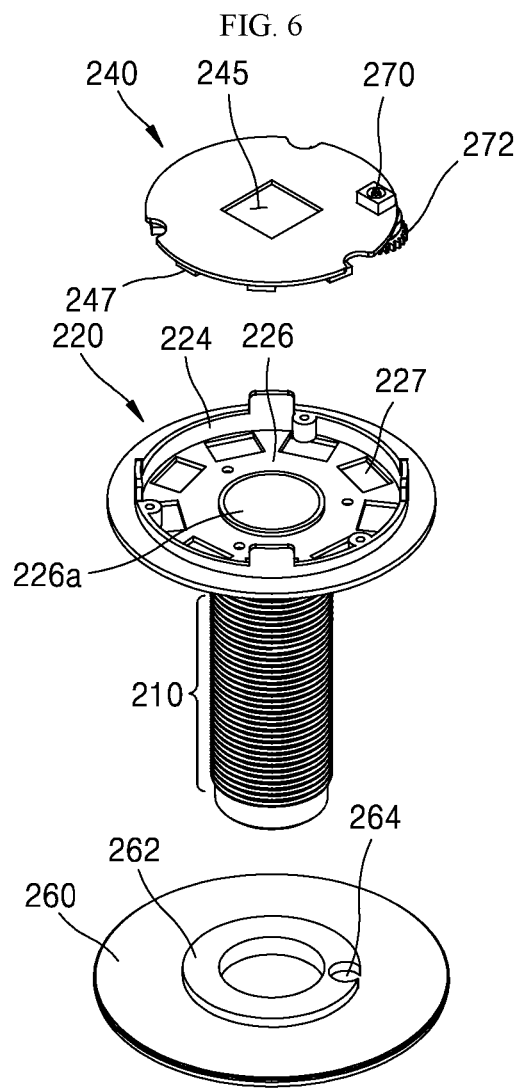
FIG. 6 is an exploded perspective view showing a lower assembly of a jog dial type operation switch according to an embodiment of the present disclosure.

FIG. 6 is an exploded perspective view showing a lower assembly of a jog dial type operation switch according to an embodiment of the present disclosure.

A structure and operation of the lower assembly are described below in more detail with reference to FIGS. 4 and 6.

A lower assembly 200 includes a lower body 220, a lower substrate 240, and a finishing plate 260.

The lower body 220 includes a hollow shaft 210, a bottom plate 226, and an inner circumferential plate 224. The inner circumferential plate 224 is inserted into and coupled to the outer circumferential plate 122 of the upper body 120. Therefore, an outer diameter of the inner circumferential plate 224 corresponds to an inner diameter of the outer circumferential plate 122.

The bottom plate 226 extends from an outside of the hollow shaft 210 to an outside of the inner circumferential plate 224. An outer diameter of the bottom plate 226 corresponds to an inner diameter of the wheel body 320.

A ring gear 340 is coupled to a lower portion of the bottom plate 226. The bottom plate 226 and the ring gear 340 may define a stepped protrusion corresponding to each other to stably support the ring gear 340 on the bottom plate 226.

The finishing plate 260 is coupled to support the bottom surface of the ring gear 340. The finishing plate 260 is made of a light-transmitting material and a light emitted from a luminous element 247 provided in the lower substrate 240 may be guided to outside.

The finishing plate 260 has a central portion 262 having a relatively greater thickness. The central portion 262 also defines a receiving groove 264 to receive an encoder gear 272.

The encoder gear 272 receives a rotational force of the wheel assembly 300. The finishing plate 260 may not rotate with the wheel assembly 300 and remains fixed.

The luminous element 247 is disposed in an area of a light emitting hole 227 in the bottom plate 226.

A plurality of luminous elements 247 are arranged on the lower substrate 240 in a circle. On-off control or brightness control of each of the luminous elements may be preferably performed.

When the luminous element 247 disposed in the lower substrate 240 illuminates the light, the light emitted from the luminous element 247 passes through the light transmission hole 227 of the lower substrate 240 to reach the finishing plate 260 and is reflected and refracted from the finishing plate 260 and is guided to an outside of the finishing plate 260, thereby providing a ring-shaped lamp. The ring-shaped lamp may change its color or brightness to indicate an operation state according to rotation of the wheel assembly 300.

For example, if the temperature of the water discharged from the faucet is adjusted based on the rotation of the wheel assembly 300, the changes in the set temperature may be displayed by adjusting a lighting ratio of a red luminous element to a blue luminous element.

An encoder 270 is provided on the lower substrate 240 and an encoder gear 272 is connected to the encoder 270. The encoder gear 272 functions to detect the rotation of the wheel assembly 300.

A wire W2 connected to the upper substrate 140 and a wire W3 connected to the lower substrate 240 are drawn out through the hollow shaft 210 of the lower assembly 200.

Further, the hollow shaft 210 may include a screw thread on the outer circumferential surface thereof to be coupled to other devices.

For example, when the operation switch according to the present disclosure is coupled to the sink cabinet, the sink cabinet defines a through hole corresponding to the outer diameter of the hollow shaft 210 at the upper plate of the sink cabinet, the hollow shaft 210 is inserted into the through hole, and a fixing nut may be fastened to the inner side of the upper plate.

Figure 7:
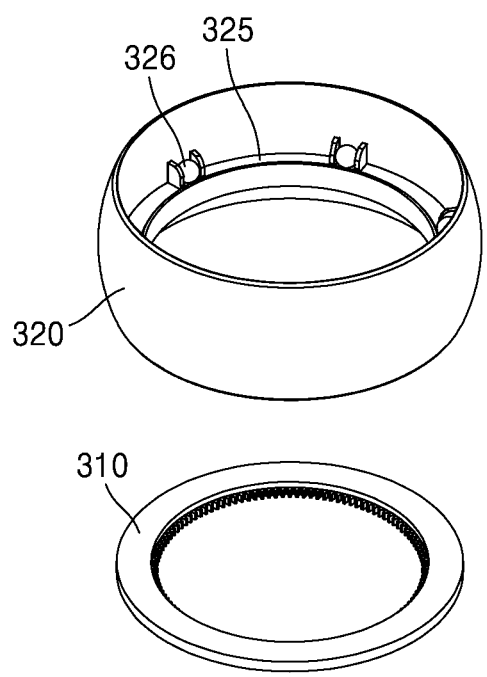
FIG. 7 is an exploded perspective view showing a wheel assembly of a jog dial type operation switch according to an embodiment of the present disclosure.

FIG. 7 is an exploded perspective view showing a wheel assembly of a jog dial type operation switch according to an embodiment of the present disclosure.

A structure and operation of the wheel assembly are described in more detail with reference to FIGS. 4 and 7.

A wheel assembly 300 includes a cylindrical wheel body 320 and a ring gear 340 coupled to a lower portion of the wheel body 320. The ring gear 340 is engaged with the above-mentioned encoder gear 272 to transmit a rotational force of the wheel assembly to an encoder 270.

The wheel assembly 300 may be coupled to surround sides of an upper assembly 100 and a lower assembly 200 and may be rotatably coupled thereto.

The wheel body 320 may include a flange 325 on an inner surface thereof and a ball bearing 326 may be coupled to the flange 325.

The flange 325 also preferably protrudes inward than an upper portion of the upper body 120, thereby preventing the wheel body 320 from being separated upward the upper body 120. A finishing plate 260 may also be coupled to the outside of the ring gear 340 coupled to the lower portion of the wheel body 320, thereby preventing the wheel assembly 300 from being separated downward.

FIGS. 8 and 9 respectively show selection operation of an upper assembly of a jog dial type operation switch according to an embodiment of the present disclosure.

As shown, a display device 160 is coupled to a support plate 124 of an upper body 120 of an upper assembly 100 to be movable using a fastening bolt 132 and the elastic jacket 130 surrounds a periphery of the fastening bolt 132.

As shown in FIG. 8, when a left side of the display device 160 is pressed, the elastic jacket 130 on the left side is compressed and a movable protrusion 124c of a support plate 124 is pressed by the display device 160 and a push switch 144 is pressed be to operated. When the external force applied to the display device 160 is released, the display device 160 returns back to an original position thereof based on a restoring force of the elastic force 130.

When a right side of the display device 160 is pressed, a push switch 144 on the right side is operated.

The push switches may be arranged radially and the display device may display the arrangement of the push switches and functions of the push switches.

Figure 10:
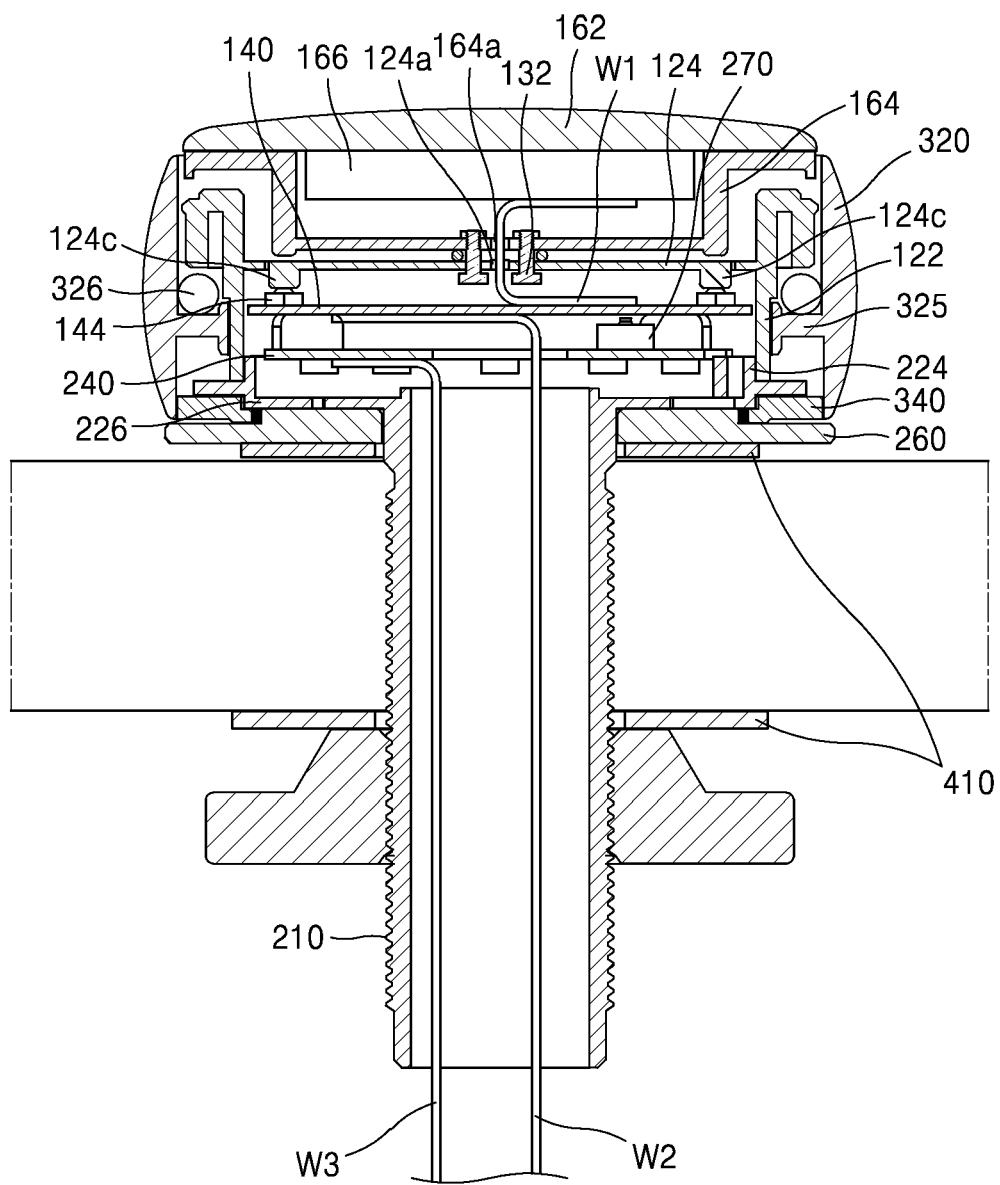
FIG. 10 is a cross-sectional view of a jog dial type operation switch coupled to an upper plate of a cabinet according to an embodiment of the present disclosure.

FIG. 10 is a cross-sectional view of a jog dial type operation switch coupled to a flat plate according to an embodiment of the present disclosure.

According to the present disclosure, the operation switch may be coupled to a flat plate 20 using a hollow shaft 210.

After the hollow shaft 210 is inserted into a through hole of a flat plate 20 in a state in which a sealing washer 410 is inserted into the hollow shaft 210, the sealing washer 410 is further inserted into a bottom surface of the flat plate 20 and coupled using a fastening nut 420. In this coupling structure, the through hole of the flat plate 20 is blocked by the sealing washer 410, such that moisture may not permeate into the flat plate 20.

Wires W2 and W3 are also protected by the hollow shaft 210 and are connected below the flat plate 20.

In some examples, the wheel assembly 300 includes a ring gear 340 as well as the wheel body 320. The inner surface of the ring gear 340 is engaged with an encoder gear 272 (see FIG. 7). Further, an upper surface of the ring gear 340 contact and is supported by a lower surface of the lower body 220 and the bottom surface of the ring gear 340 contacts and is supported by the upper surface of the finishing plate 260.

Figure 11:
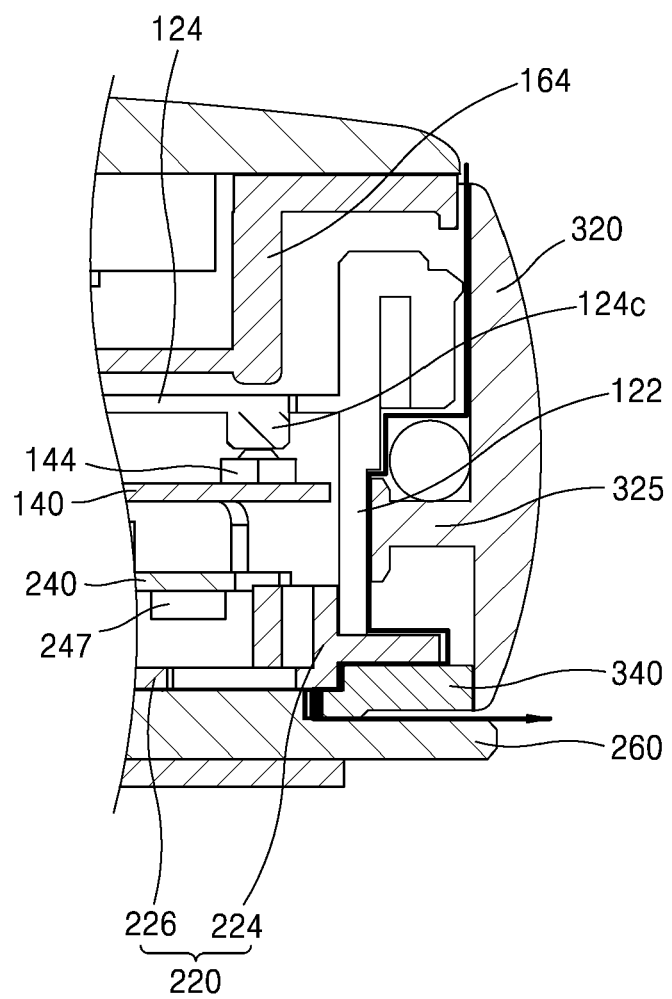
FIG. 11 is a cross-sectional view showing drainage of a jog dial type operation switch according to an embodiment of the present disclosure.

FIG. 11 is a cross-sectional view of drainage of a jog dial type operation switch according to an embodiment of the present disclosure.

A display device 160 of an upper assembly 100 is only exposed in appearance and the upper assembly 100 has a gap with a wheel assembly 300. The gap between an upper body 120 and the wheel assembly 300 may be required to perform the push operation of the display device and smooth rotation of the wheel assembly.

According to the present disclosure, water may not permeate into an inner panel or a switch and may be discharged even when the water is permeated through the gap.

As shown, even if moisture is introduced between the upper assembly 100 and the wheel assembly 300, the introduced moisture may not be permeated into an outer circumferential plate 122 of the upper body 120.

The outer circumferential plate 122 has a cylindrical shape and is disposed in parallel to a vertical direction of gravity and defines an inclined portion inclined downward at an upper end thereof.

Therefore, even if the water is introduced through the gap between the wheel assembly 300 and the display device 160, the introduced water flows down along an outside of the outer circumferential plate 122 of the upper body 120, such that the water may not be introduced into the display device 160 and the upper substrate 140 disposed in the outer circumferential surface 122.

Figure 12:
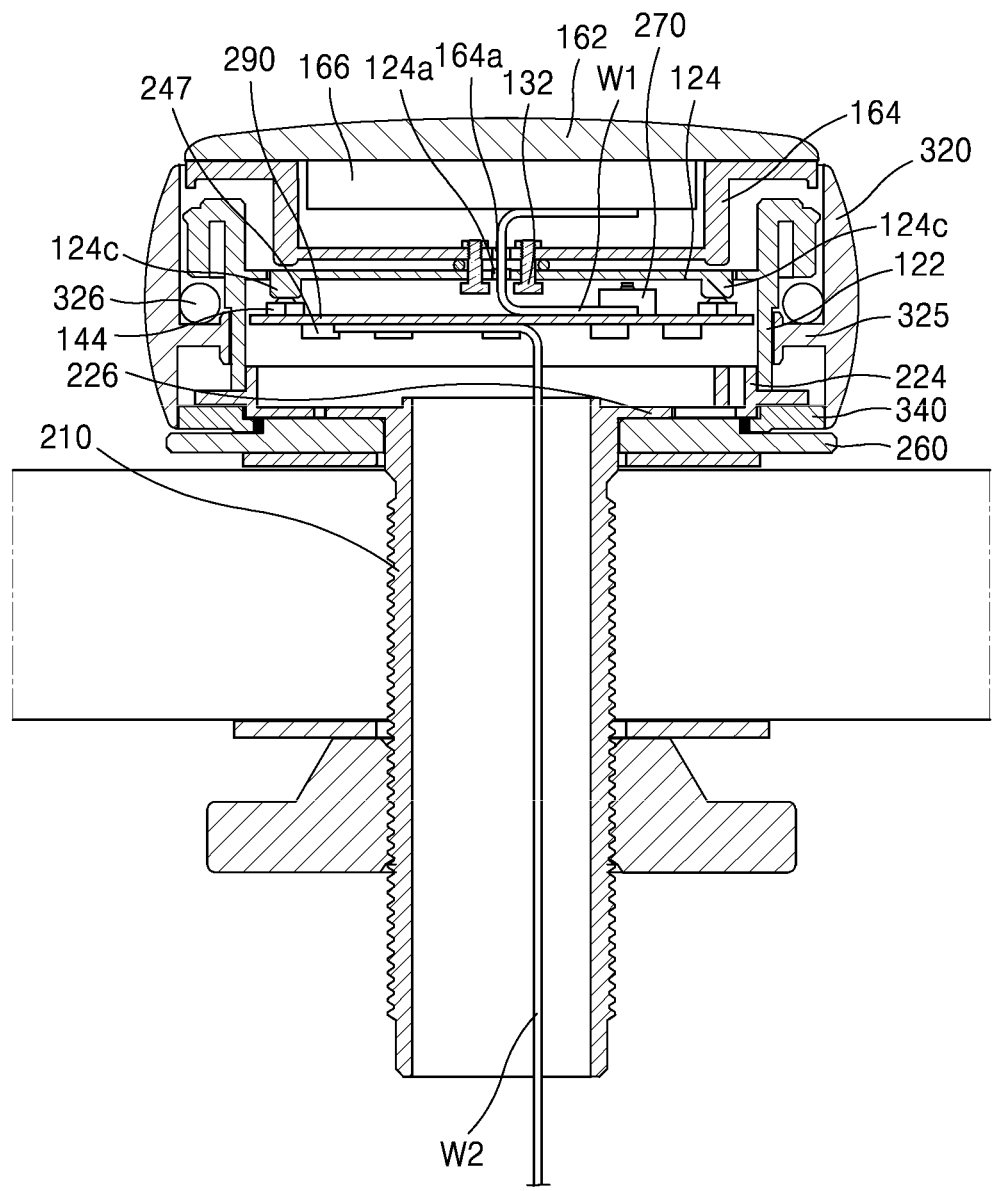
FIG. 12 is a cross-sectional view of a jog dial type operation switch according to another embodiment of the present disclosure.

FIG. 12 is a cross-sectional view of a jog dial type operation switch according to another embodiment of the present disclosure.

The present embodiment shows an upper substrate and a lower substrate configured as a single circuit substrate, in contrast to the above embodiment in which the upper substrate is provided in the upper assembly and the lower substrate is provided in the lower substrate.

As shown, a circuit substrate 290 is disposed between an upper body 120 and a lower body 220. A luminous element is provided on a lower surface of the circuit substrate 290 and a push switch 144 is also disposed on an upper surface of the circuit substrate 290. In this case, the push switch 144 is disposed below a movable protrusion 124*c* of the upper body 120.

This embodiment has the same configuration as the previous embodiment except that the upper substrate and the lower substrate are integrated into a single substrate, and thus, the redundant description is omitted.

Integrating a single circuit substrate with the upper substrate and the lower substrate may result in a reduction in cost due to a reduction in a number of components and miniaturized sizes of products.

A sink cabinet device according to an embodiment of the present disclosure is described below.

Figure 13:
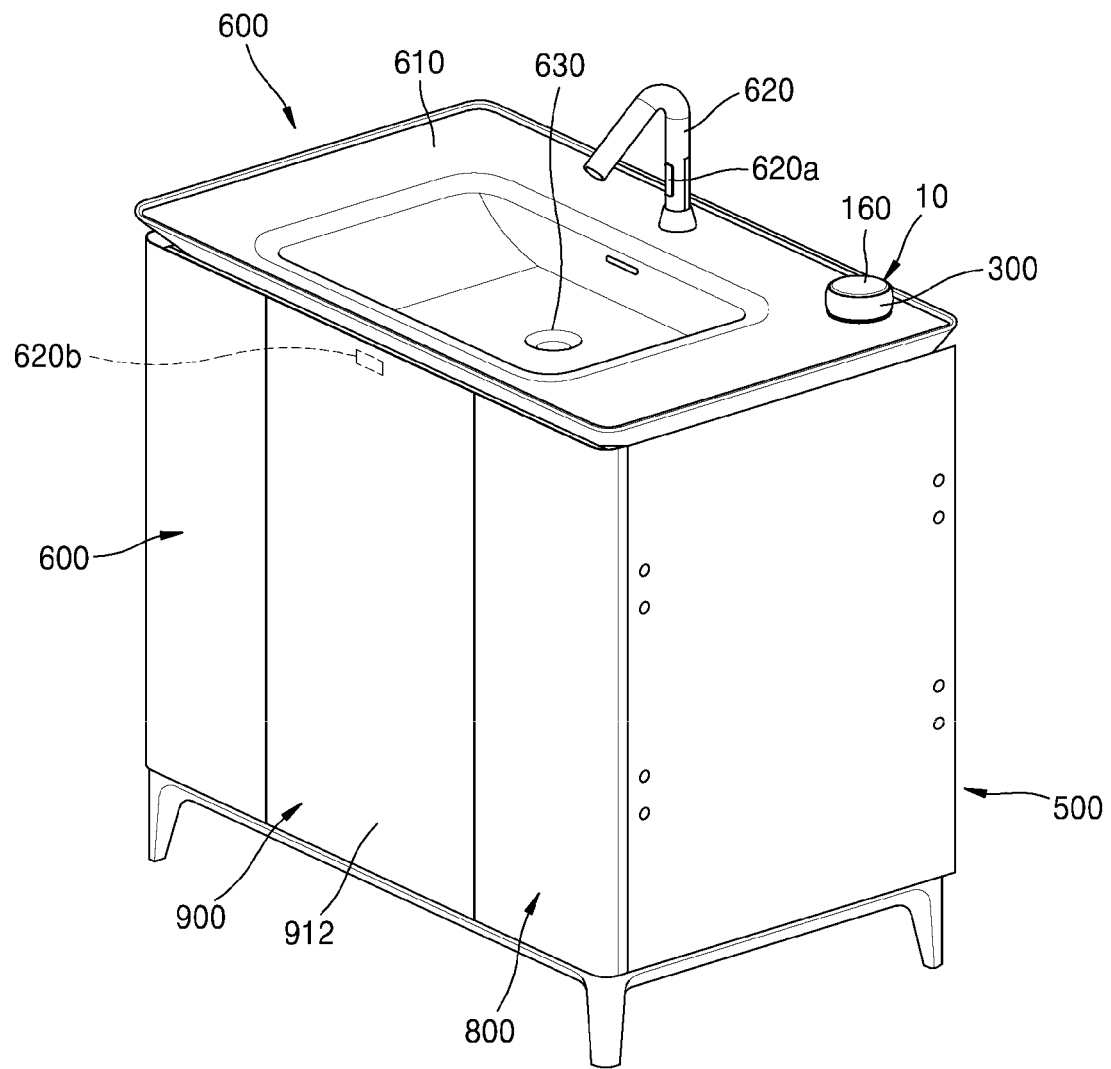
FIG. 13 is a perspective view showing a sink cabinet device according to an embodiment of the present disclosure.
Figure 14:
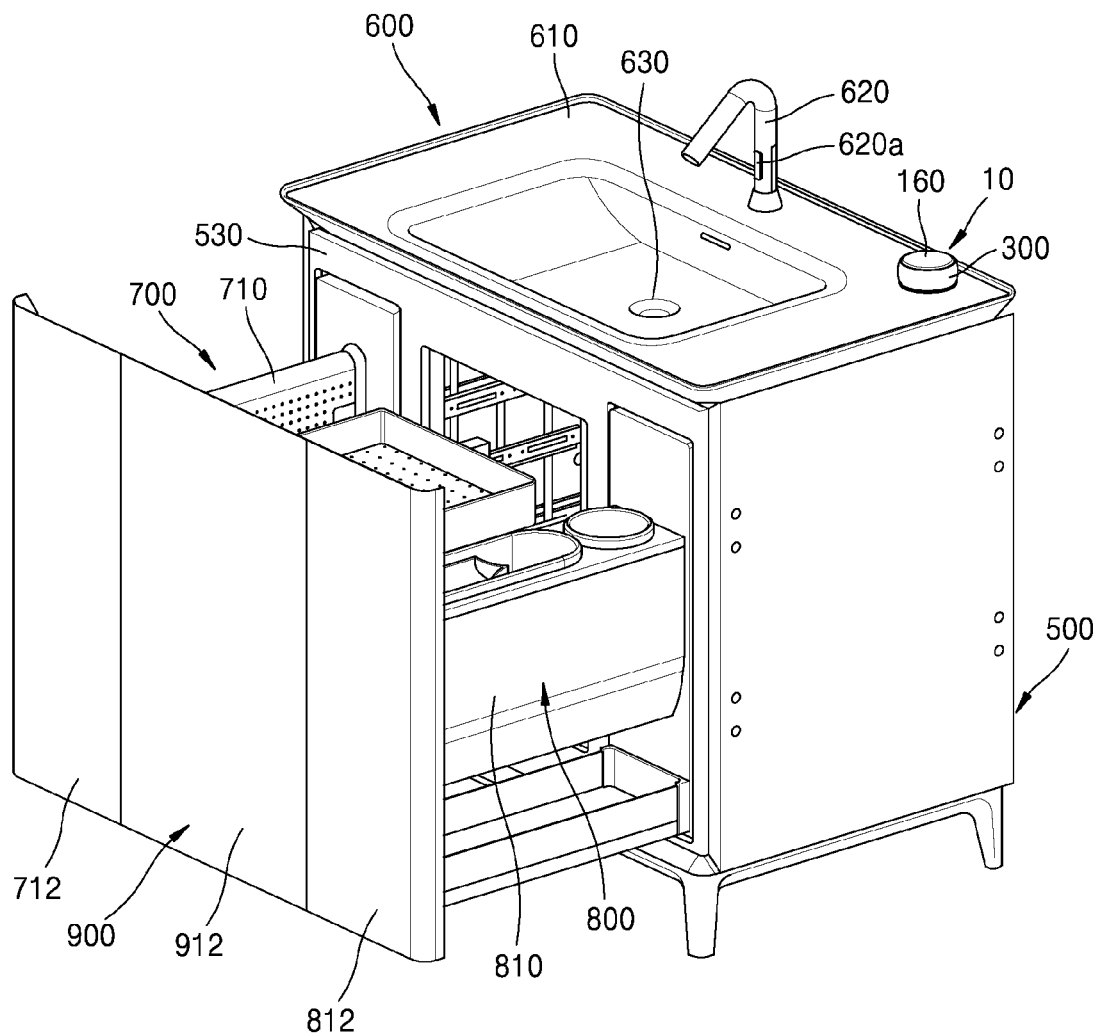
FIG. 14 is a perspective view showing an open sink cabinet body of a sink cabinet device according to an embodiment of the present disclosure.
Figure 15:
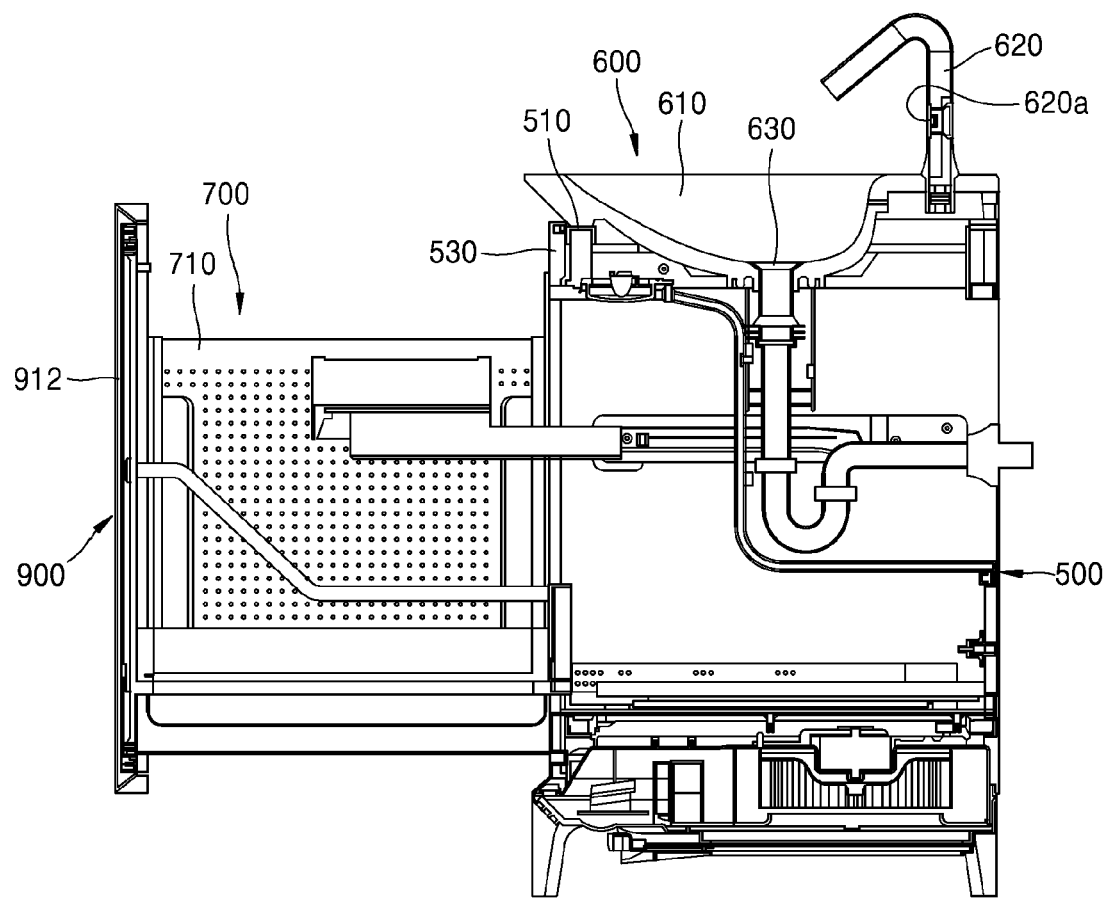
FIG. 15 is a cross-sectional view of an open sink cabinet body of a sink cabinet device according to an embodiment of the present disclosure.

FIG. 13 is a perspective view showing a sink cabinet device according to an embodiment of the present disclosure. FIG. 14 is a perspective view showing an open sink cabinet body of a sink cabinet device according to an embodiment of the present disclosure. FIG. 15 is a cross-sectional view of a sink cabinet device including an open cabinet body according to an embodiment of the present disclosure.

Referring to FIGS. 5 to 13, according to an embodiment of the present disclosure, the sink cabinet device is a convenience device installed in bathrooms and includes a bath sink 600, a sink cabinet body 500, and functional drawer modules 300 and 400.

The sink cabinet body 500 provides structural strength and defines an appearance. The sink cabinet body 500 has a hexahedron box shape, and the bath sink 600 is disposed on the sink cabinet body 500.

The bath sink 600 includes a faucet 620 connected to a water supply pipe and a drain valve 630 connected to a drain pipe and the water supply pipe and the drain pipe are disposed in a lower space of the bath sink 600. The water supply pipe and the drain pipe are embedded in the wall or a bottom surface and connected to a portion in which the sink cabinet body 500 is disposed.

The bath sink 600 includes a bath sink body 610 having a reservoir to contain water, a faucet 620 disposed at one side of the bath sink body 610 to supply the water, and a drain valve 630 disposed on a bottom surface of the bath sink body 610. The faucet 620 of the bath sink 600 is connected to the water supply pipe and the drain valve 630 is connected to the drain pipe.

The faucet 620 of the bath sink 600 is connected to the water supply pipe and the water supply pipe may include a cold water pipe and a hot water pipe.

A heater may be connected to the faucet 620 at one side of the water supply pipe. The heater may heat water supplied to the faucet 620 through the water supply pipe. In particular, the heater may control the temperature of the water discharged from the faucet 620 to be constant by heating the water supplied to the faucet 620 at the beginning of water supply.

The faucet 620 may include an electronic valve. The electronic valve may be used to operate a temperature of water and an amount of water supplied through the faucet 620, which may be performed by a jog dial operation switch 10 described above.

The jog dial type operation switch 10 may be connected to an integrated controller (not shown) to operate and control the sink cabinet device.

The integrated controller controls the above-mentioned drawer-type towel management unit 700, a drawer-type console 800, and a faucet 620 of a bath sink 600.

Controlling the faucet 620 refers to controlling a basic quantity of water discharged from the faucet, the temperature of the water discharged from the faucet, sensitivity of a faucet sensor 620*a* that controls the discharge of the water from the faucet.

For example, in some cases where the faucet 620 is not mechanically operated but operates electronically in an automatic or semi-automatic manner, a specific operation environment setting of the faucet 620 may be operated using the jog dial type operation switch 10 (hereinafter; "the dial operation switch").

The above-described dial operation switch 10 is the jog dial type switch having a vertical shaft, is attached to the sink cabinet device, and may also be separated from the sink cabinet device, and may be disposed at a position such that the dial operation switch 10 is disposed in a direction vertical to the wall surface.

The dial operation switch 10 may select an operating object through the display device 160 and may adjust a desired degree (e.g., a temperature, strength, sensitivity, and a time) by rotating the dial.

In some cases where an amount of water discharged from the faucet 620 is adjusted, the amount of discharged water may be set to be increased by turning the wheel assembly 300 clockwise.

In some cases where the temperature of the water discharged from the faucet 620 is adjusted, the temperature may be increased by turning the wheel assembly 300 clockwise.

The dial operation switch 10 may operate operations of various types of electronic components such as heaters, blowers, and the like, as well as the faucet 620 and may use a method of selecting the control target object by turning the wheel assembly 300.

The sink cabinet device may further include a sensor 620*a* capable of sensing approach of the body of the user or a position of hands of the user in the bath sink 600. The sensor 620*a* may detect the user and information sensed by the sensor 620*a* may be transmitted to the controller and may be used to control an electronic valve of the faucet 62.

For example, the sensor 620*a* may be disposed at one side of the faucet 620 to detect the position of the user's hand. The position of the sensor 620*a* is not limited by the present embodiment and the sensor 620*a* may be disposed in the bath sink body 610 to detect proximity of the user's hand.

The sink cabinet body 500 includes a frame 510 that forms a skeleton and provides strength. The sink cabinet body 500 includes a frame 510 and a panel 530 attached to the frame 510. The panel 530 may be coupled to the frame 510 to define the appearance of the sink cabinet body 500.

Figure 16:
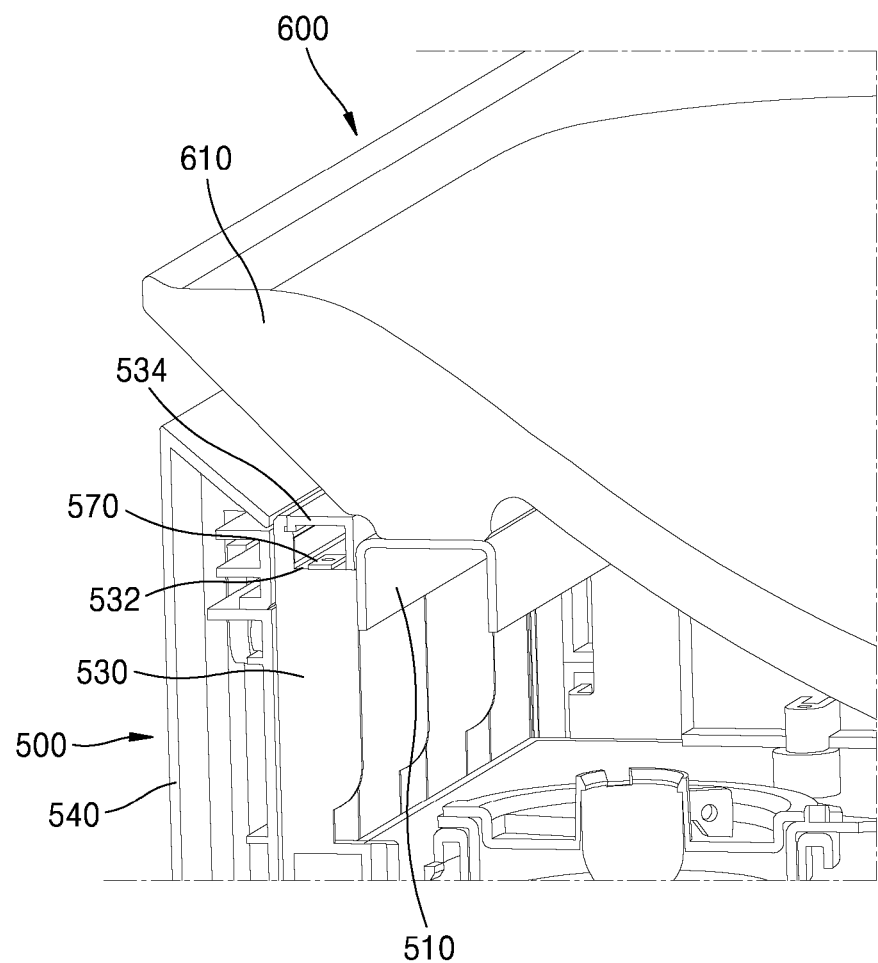
FIG. 16 is an enlarged partial cutaway perspective view showing a sink cabinet device according to an embodiment of the present disclosure.

FIG. 16 is a partially cutaway, enlarged perspective view showing a sink cabinet device according to an embodiment of the present disclosure.

Referring to FIG. 16, a sink cabinet body 500 may include a lamp 570 at one side of an upper end thereof. The lamp 570 may emit light to a bath sink 600.

Preferably, the lamp 570 may be controlled to change colors in association with operation states of electronic components as the user operates the electronic components such as heaters and electronic valves using an operation switch 10.

The lamp 570 may be controlled to change the colors according to the operation states of the electronic components or emit the light under predetermined conditions, and may be used as a indirect lamp that changes atmosphere or illuminates indoors.

Preferably, in the present embodiment, the lamp 570 may change the lamp color based on a temperature of water supplied to a faucet 620. In some cases where the temperature of the water supplied to the faucet 620 is room temperature, the lamp 570 may emit a blue series light and may emit a red series light as the temperature of the water increases.

To this end, the sink cabinet device may include a sensor that senses the temperature of the water supplied to the faucet 620 and the sensor may transmit the temperature information to a controller that controls operation input to the operation switch 10.

The controller may control the operation of the heater based on a difference between the temperature of the water input to the operation switch 10 and the temperature of the water measured by the sensor. The controller may also be connected to the lamp 570 to control the lamp 570 to change the colors based on the temperature of the water. In some examples, the lamp 570 may be used as an indirect lamp of the bathroom and may illuminate the light to the bath sink 600 disposed above the lamp 570 to illuminate surroundings.

The bath sink body 610 of the bath sink 600 may be made of a light-transmitting material. In some cases where the bath sink body 610 is made of the light-transmitting material, the light emitted from the lamp 570 is guided through the inside of the bath sink body 610, such that the bath sink body 610 softly emits the light.

The lamp 570 changes the lamp color based on the temperature of the water discharged from the faucet 620 and may also be controlled to change the lamp color during electrical operation of electric components disposed in the sink cabinet device.

In detail, the lamp 570 may change the lamp color according to a time period set by the user in advance and the lamp 570 may also change the lamp color based on the temperature or humidity of the bathroom. In the present embodiment, the sink cabinet device may further include a sensor that detects a temperature or the humidity of the bathroom.

The sink cabinet device may further include a communicator connectable to an Internet server and may change the lamp color of the lamp 570 based on weather information and time information obtained by the communicator.

The lamp 570 may change the lamp color set according to various conditions. In the present embodiment, the conditions set for the lamp 570 or a technique for obtaining it may not be described in detail.

Further, in the present embodiment, the lamp 570 is disposed at an upper end of the sink cabinet body 500 and a lamp seating part 532 may be disposed at the upper end of the sink cabinet body 500 to accommodate the lamp 570.

(a) and (b) of FIG. 17 are enlarged cross-sectional views of a lamp of a sink cabinet device according to an embodiment of the present disclosure.

A lamp seating part 532 may define an opening at an upper portion thereof and may mount a lamp 570 through the open upper space thereof.

Further, a light-transmitting lamp cover 534 may be disposed above the lamp seating part 532. The lamp 570 may illuminate by transmitting the light to the bath sink 600 disposed above through the light-transmitting lamp cover 534.

The lamp 570 may also be prevented from being submerged in the water flowing down from the bath sink 600 as the lamp seating part 532 is blocked from the outside by the lamp cover 534.

Specifically, in the present embodiment, the sink cabinet body 500 includes an external panel 530 that defines an appearance and the lamp seating part 532 may be disposed at an upper end of the panel 530.

Further, in the present embodiment, the lamp seating part 532 may define a groove having a square shape at the upper end of the panel 530 as shown in (a) of FIG. 5.

In some examples, the shapes of the lamp seating part 532 are not limited to this embodiment and may be changed into various shapes. For example, the lamp seating part 532 may have various shapes such that the lamp 570 mounted on the lamp seating part 532 transmits the light to the bath sink 600 disposed above.

For example, as shown in (b) of FIG. 5, a lamp seating part 532' may define a semicircular groove recessed downward to reflect light emitted from a lamp 570' upward. In some cases where the lamp seating part 532' defines the semicircular groove and a light source is disposed at a central region thereof, the light is reflected from a surface of the lamp seating part 532' and may be concentrated upward.

Further, in the present embodiment, the lamp 570 is mounted on the lamp seating part 532' and may also be mounted on the lamp cover 534' to transmit the light toward the lamp seating part 532', and in this case, the lamp seating part 532' may preferably enable the light of the lamp 570' to reflect from upward. To this end, the lamp seating part 132' may be coated with light reflective material on the surface thereof.

The lamp seating part 532 may have various shapes such as a 'U-shape' and an 'L-shape' as well as the square groove and the semicircular groove. The lamp cover 534 provided to the lamp seating part 532 may have various shapes such that the lamp cover 534 blocks the lamp 570 mounted therein to correspond to the shape of the lamp seating part 532.

The lamp cover 534 may have an 'l-shape', an 'L-shape', and the like. The lamp cover 534 may be provided as a diffusion panel and the light transmitted from the lamp 570 may be uniformly diffused.

The lamp 570 may use various types of luminous elements and a light emitting diode (LED) device may be widely used in various fields as an example of the luminous element. In some cases where the lamp 570 includes the LED device, heat may be generated in a process of emitting light by the LED device.

Figure 18:
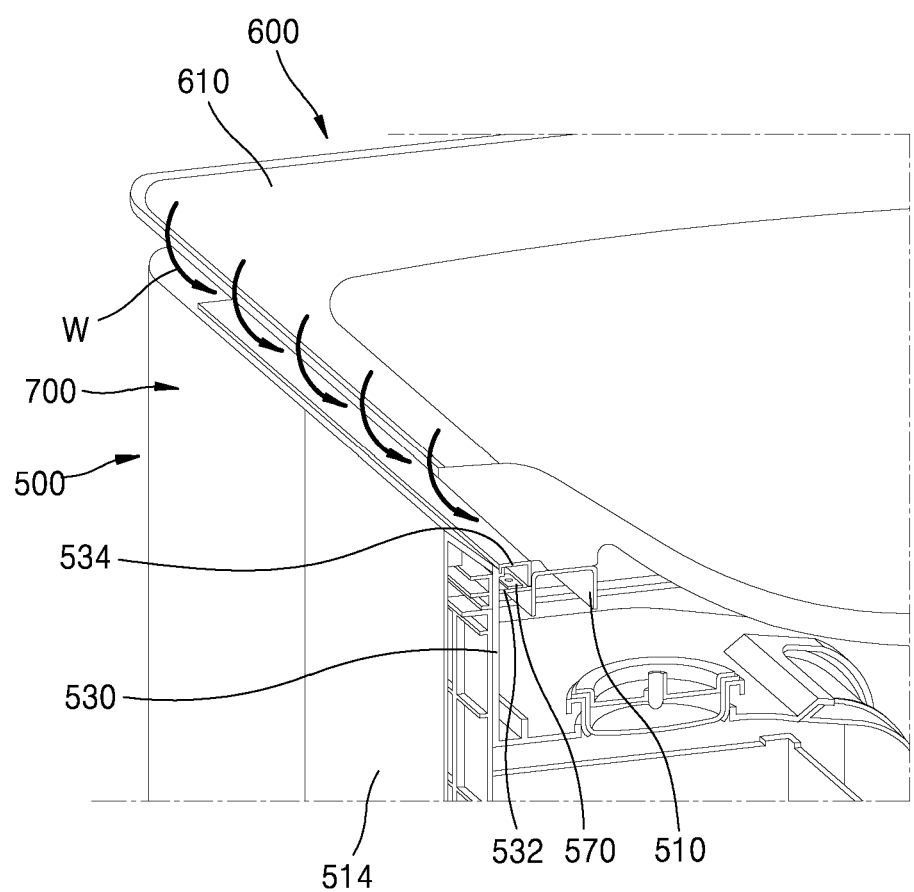
FIG. 18 is a partially cutaway perspective view showing water flowing out of a bath sink of a sink cabinet device according to an embodiment of the present disclosure.

FIG. 18 is a partially cutaway perspective view showing water flowing out of a bath sink of a sink cabinet device according to an embodiment of the present disclosure. FIGS. 19A and 19B respectively show a heating member that dries water flowing out of a bath sink of a sink cabinet device according to an embodiment of the present disclosure.

Referring to FIGS. 18 and 19, in the sink cabinet device, water is used in a process of using the bath sink 600, and some of the water may flow down along the bath sink 600. The water flowing down from the bath sink 600 may be accumulated at an upper end of the sink cabinet body 500.

As shown in (a) of FIG. 19, a lamp 570 is disposed at an upper end of the sink cabinet device and heat generated during the operation of the lamp 570 is used to heat and dry water (W) flowing down from the bath sink 600 to an upper portion of the sink cabinet body 500.

The lamp 570 may also be mounted on one side of the lamp seating part 532 to heat a space in the lamp seating part 532, thereby heating and drying the upper portion of the external panel 530.

Preferably, the LED device used as the lamp 570 dissipates the heat toward a position corresponding to a direction opposite to the light emitting direction and the LED device may be mounted below the lamp cover 534.

In the present embodiment, the water flowing down from the bath sink 600 is heated and dried by the heat generated by the lamp 570 of the sink cabinet body 500, for example, on an external panel 530 and the water flowing down from the bath sink 600 may also be heated and dried by an additional heating member 580 provided at one side of the upper end of the sink cabinet body 500.

In the present embodiment, a heating member 580 is located at the upper end of the sink cabinet body 500 as shown in (b) of FIG. 19, may be disposed together with the lamp 570 in the aforementioned lamp seating part 532, may be disposed on the lamp cover 534 or disposed in the lamp cover 534.

Further, in this embodiment, the position of the heating member 580 is not limited and may be provided at various positions such that the heating member 580 dries the water flowing down from the bath sink 600. For example, a heating member 180' may be disposed at a circumference of a lower end of the bath sink 600.

The heating member 580 may also be disposed at the upper end of the sink cabinet body 500 and the heating member 580' may be disposed at the lower end of the bath sink 600.

The heating members 580 and 580' each may include a heating wire member and the heating wire member may be connected to the controller to control supplied power, thereby controlling heat generation.

The controller may control the operation of the heating members 580 and 580' during a predetermined period of time or at predetermined time intervals. The controller may also control the operation of the heating members 580 and 580' based on information measured by a humidity sensor.

The operation of the sink cabinet device described above is as follows.

The sink cabinet body 500 is disposed under the bath sink 600. The sink cabinet body 500 includes an external panel 530 and the lamp seating part 532 is disposed at the upper end of the external panel 530 to mount the lamp 570.

The bath sink 600 includes a faucet 620 and the operation thereof is controlled by the operation switch 10 disposed at one side thereof.

When the user operates the operation switch 10 to set the amount of supplied water and the temperature, an electronic valve connected to the faucet 620 is opened and the heater is operated to supply the water in which the water supply amount and the temperature is adjusted to the set water supply amount and temperature to the bath sink 600 through the faucet 620.

In this case, the lamp color of the lamp 570 is changed based on the temperature of the water supplied from the faucet 620. The lamp 570 emits blue series lights in the case where the temperature of the water supplied from the faucet 620 is low and emits red series lights as the temperature of the water increases.

The user may determine the use state such as the temperature of the water when the faucet 620 is used based on the lamp color of the lamp 570 during using of the sink cabinet device by the user.

For example, when the lamp color of the lamp 570 is blue, the user may determine that the water supplied from the faucet 620 is cold water, thereby preventing sudden contact with the water having a low temperature discharged from the faucet 620.

When the lamp color of the lamp 570 is bright red, the user may also determine that the water supplied from the faucet 620 is very hot water and may not contact the water supplied from the faucet 620, thereby preventing burn in advance. The user may determine that the temperature of the water supplied from the faucet 620 is set to be the preset temperature when the lamp color of the lamp 570 suitable for the preset temperature is illuminated.

According to an embodiment, the sink cabinet device may identify the temperature of the water based on changes in color of the lamp of the lamp 570, may prevent the sudden contact with cold water in cold weather, thereby improving emotional qualities, and may prevent injury such as burn due to the contact with the hot water beforehand, thereby preventing safety accidents.

In particular, in the present embodiment, the user may intuitively identify the temperature of the water based on changes in color of lamp of the lamp 570 of the sink cabinet device even in the case of illiterate or careless people, such that the user may safely use the sink cabinet device.

Further, in the sink cabinet device, when the water flows down to the sink cabinet body 500, for example, an upper portion of the external panel 530 from the bath sink 600, the water may be remained at the upper portion of the external panel 530 of the cabinet body 500.

The water remaining at the upper portion of the external panel 530 of the sink cabinet body 500 is heated and dried by the heat generated by emitting the light by the lamp 570, such that the upper portion of the sink cabinet body 500 remains dried and cleaned.

Figure 20:
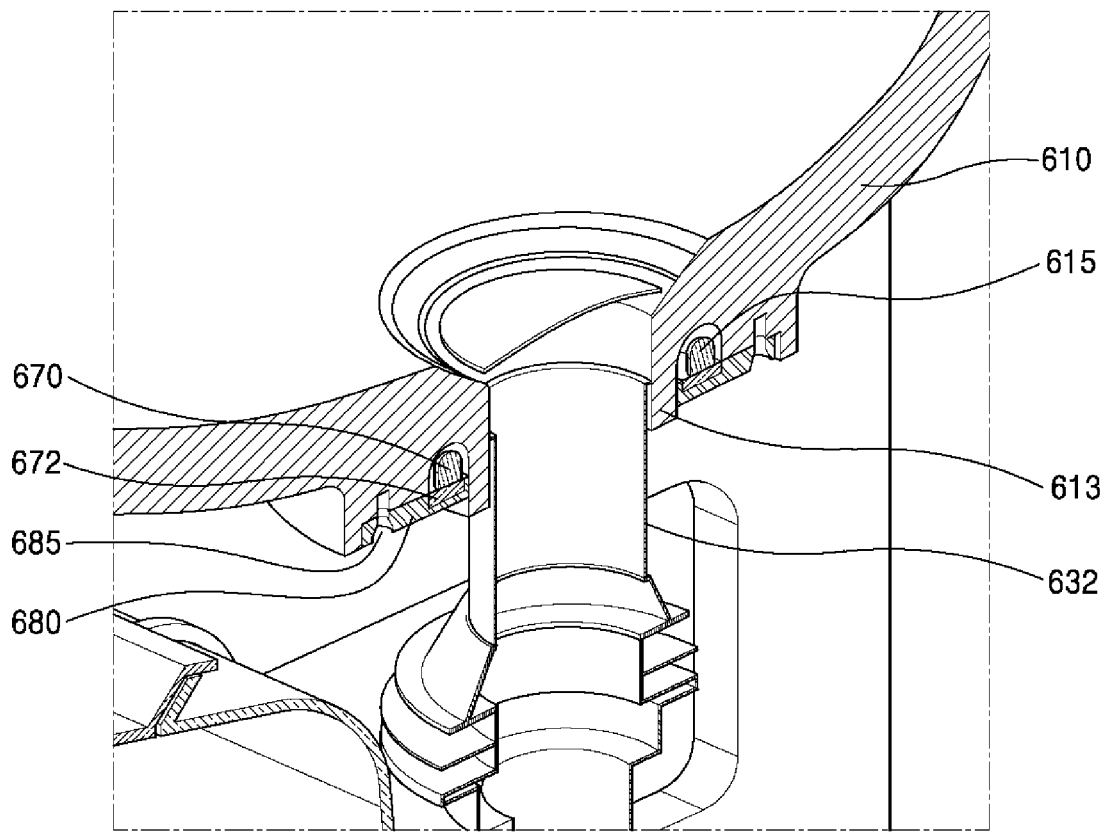
FIG. 20 is a cutaway perspective view showing a bath sink of a sink cabinet device according to an embodiment of the present disclosure.

FIG. 20 is a cutaway perspective view showing a bath sink of a sink cabinet device according to an embodiment of the present disclosure.

As shown, according to an embodiment of the present disclosure, the sink cabinet device defines a lamp installation groove 615 around a connecting pipe 613 to which a drain pipe 632 is coupled at a lower portion of a bath sink body 610, and a light source 670 is embedded in the lamp installation groove 615.

The bath sink body 610 may be made of a light-transmitting material. The bath sink may be made of ceramic, which may not transmit the light. The bath sink body may be made of synthetic resin or natural resin, or glass and the bath sink body 610 may have light-transmitting properties.

The light transmittance may not refer to a light transmittance to completely pass the light, but may refer to a light transmittance configured such that light may be diffused and leaked to outside. When the light emitted from a light source is 100%, if 10% or more of light is emitted through the bath sink body 610, it has the light-transmitting properties.

According to the present disclosure, the bath sink body 610 is made of the light-transmitting material and the light source 670 is embedded around a drain pipe 632 such that the bath sink body 610 performs as the lamp to softly diffuse the light.

The bath sink 600 may be frequently used in a bathroom environment. In the bath sink 600, washing faces, washing hands, brushing teeth, and the like, may be performed.

The bath sink 600 may also be disposed at a height corresponding to a waist height of the user in consideration of a height of the user and may be disposed at a middle height in the bathroom space.

Accordingly, when the light is emitted from the bath sink 600, the light is emitted from the middle portion in the bathroom space, the lamp of the bath sink 600 may be effectively used as a mood lamp to influence atmosphere of the bathroom indoor environment.

As the water is used in the bath sink 600, damages due to water permeation may be considered to install the lamp in the bath sink.

According to the present disclosure, the bath sink 600 defines a lamp installation groove 615 at an upper portion of the connecting pipe 613 to which the drain pipe 632 is coupled, disposes the lamp in the lamp installation groove 615, and covers an outside of (e.g., below) the lamp installation groove 615 by a lamp cover 680, thereby protecting the lamp installed in the bath sink 600 from the water permeation and improving aesthetic balance.

The lower cover 680 may be coupled to the bath sink body 610 by inserting a fastening screw into a fastening groove 685 to check or repair the internal light source 670 by opening the lower cover 680.

The bath sink body 610 defines a reservoir space and a drain valve 630 is disposed at a lowest portion of the reservoir space. The reservoir space has a planar shape, such as a circular shape, an oval shape, or a quadrangle shape and the drain valve 630 is disposed at a center of the surface of each of these shapes.

Accordingly, in the case where the light source is disposed in a circular shape around the drain valve 630, the light source is disposed at the center of the bath sink, such that the bath sink body 610 uniformly diffuses the light emitted from the light source.

In order to further prevent moisture from permeating into the light source 670, a bottom surface of the lower cover 680 may be preferably disposed at a position higher than the lower end of the connecting pipe, to prevent the leaked water from penetrating into the lower cover 680 even if a water leakage occurs between the drain pipe 632 and the connecting pipe 613.

A plurality of LEDs may be used as the light source 670 and the plurality of LEDs may be installed in a circuit substrate 672 and may be disposed in the lamp installation groove 615. In this case, a C-shaped flexible circuit substrate may be used as the circuit substrate 672.

The lamp installation groove 615 may have a circular shape such that the lamp installation shape 615 surrounds a periphery of the connecting pipe 613. When the lamp installation groove 615 is defined as a circular groove surrounding the periphery of the connecting pipe 613, when the light source 670 is illuminated, the circular lamp surrounding the periphery of the drain valve 630 is illuminated.

The lamp has excellent aesthetic qualities and functions as an indirect lamp and as a lamp to illuminate the interior of the bath sink.

In some cases where the circuit substrate 672 has a circular shape, the drain pipe 632 may be disassembled to separate the light source 670 when repair or replacement is performed due to a failure of the light source 670.

A light source may be coupled to the C-shaped flexible circuit substrate to avoid the inconvenience. In some cases where the light source is disposed on the C-shaped flexible circuit substrate, the light source may be assembled or disassembled to or from the lamp installation groove 615 without removing the drain pipe 632.

In some examples, the light source 670 may define various colors. For example, it is desirable to dispose red LEDs, blue LEDs, and green LEDs and change their respective illumination levels such that the lamp color and brightness may be adjusted. For example, various colors of lamp may be desirably implemented with a combination of three primary colors of the light sources.

In a simpler form, a light source of two colors may be provided. Various colors of spectrum may be implemented by adjusting a mixing ratio between the two colors. In some cases where the light source includes the blue light source and the red light source, only blue light may be illuminated to display blue, only red light may be illuminated to display red, and both may be turned to display magenta, and various colors including a mixture of the blue color and the red color may be displayed by adjusting the brightness of each of the blue color and the red color.

The lamp color may be changed based on the temperature of water discharged through the faucet 620. In some cases where the temperature of the water that passes through the faucet 620 is room temperature, the light source 670 may emit the blue series light and may emit the red series color as the temperature of the water increases.

To this end, the sink cabinet device may include a sensor that senses the temperature of the water that passes through the faucet 620 and the sensor may transmit temperature information to an integrated controller that controls operation input to an integrated operation switch 170.

The integrated controller may control the operation of the heater based on a difference between the temperature of the water input to the integrated operation switch 170 and the temperature of the water measured by the sensor. The controller may also be connected to the light source 670 to control the lamp color to be changed depending on the temperature of the water.

Figure 21:
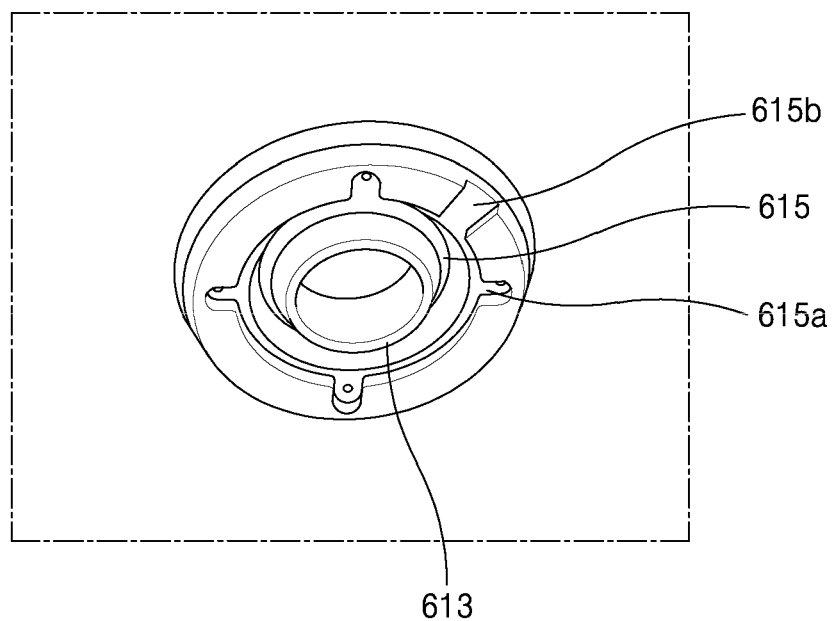
FIG. 21 shows a lamp installation groove defined in a bath sink of a sink cabinet device according to an embodiment of the present disclosure.
Figure 22:
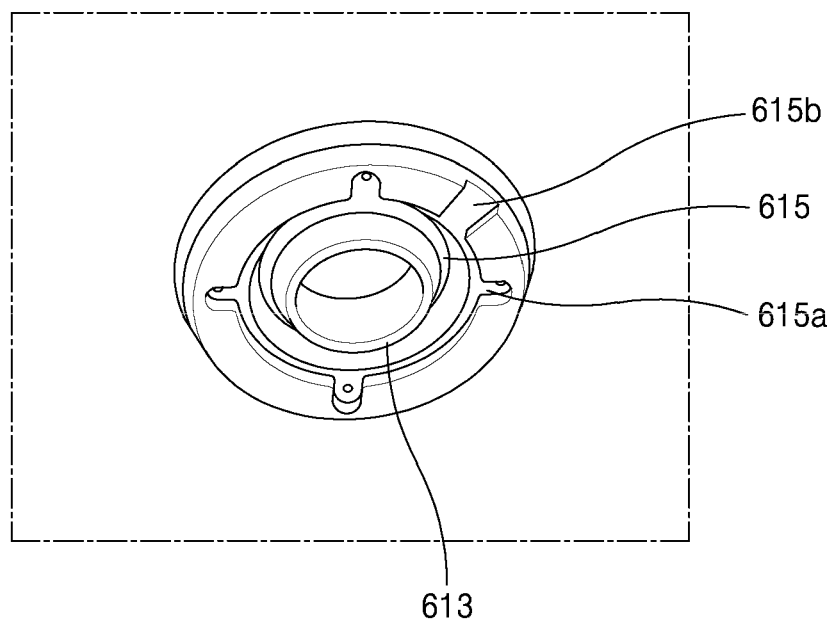
FIG. 22 shows a lamp cover coupled to a light installation groove defined in a bath sink of a sink cabinet device according to an embodiment of the present disclosure.

FIG. 21 shows a lamp installation groove disposed in a bath sink of a sink cabinet device according to an embodiment of the present disclosure. FIG. 22 shows a lamp cover coupled to a lamp installation groove disposed in a bath sink of a sink cabinet device according to an embodiment of the present disclosure.

As shown, a connecting pipe 613 to which a drain pipe is connected extends from a bottom surface of the bath sink body. The lamp installation groove 615 is disposed at a position higher than a lower end of the connecting pipe 613.

The lower end of the lamp installation groove 615 is disposed at a position higher than the lower end of the connecting pipe 613 to prevent the water from permeating into the lamp installation groove 614 in the case where water leakage occurs between the connecting pipe 613 and a drain pipe.

The lamp installation groove 615 may have a circular planar shape and may further define a wire groove 615b, at one side, through which wires may be drawn out. The wire connected to the light source disposed in the lamp installation groove 615 is drawn out through the wire groove 615b.

Various lamp applications of the sink cabinet device including the bath sink lamp according to the present disclosure are described below.

FIG. 22 shows a lower cover 680 divided into two portions by dotted lines. The lower cover 680 may be configured as a single circular component but for convenience of detachment, the lower cover 680 may have a C shape such that one side is cut or may be divided into a plurality of portions.

According to the present disclosure, the bath sink body of the sink cabinet device is made of a light-transmitting material and a light source is disposed around a drain pipe of the bath sink body to emit the light, which has been emitted from the light source, through the bath sink body. This is referred to as "bath sink lamp" below.

The bath sink lamp may be used to indicate the temperature of the water discharged from a faucet.

The bath sink lamp may also be used as an indicator lamp to display the operation of each of other functional modules of the sink cabinet device.

The towel management unit described above may be set to be operated for a predetermined period of time to heat and dry the towels. In this case, the operation time of the towel management unit may be displayed using the bath sink lamp.

In some cases where the towel management unit is operated for 30 minutes, when the towel management unit starts to operate, the bath sink lamps disposed in a circle are all illuminated and illuminated areas are reduced based on a ratio of remaining time. In some cases where 50% of operation time is left, lamps corresponding to a semicircular shape are illuminated. In some cases where 25% of operation time is left, lamps corresponding to a quartile circle are only illuminated.

The bath sink lamp may also be used as a welcome lamp illuminated when it detects that the user is approaching to the bathroom. To this end, the sink cabinet device may include a proximity sensor 620*b* (see FIG. 13). The bath sink lamp is illuminated based on detection that the user is approaching by the proximity sensor 620*b*.

Further, a method of using the bath sink lamp is not limited to the above-described examples and may be modified in various manners.

Figure 23:
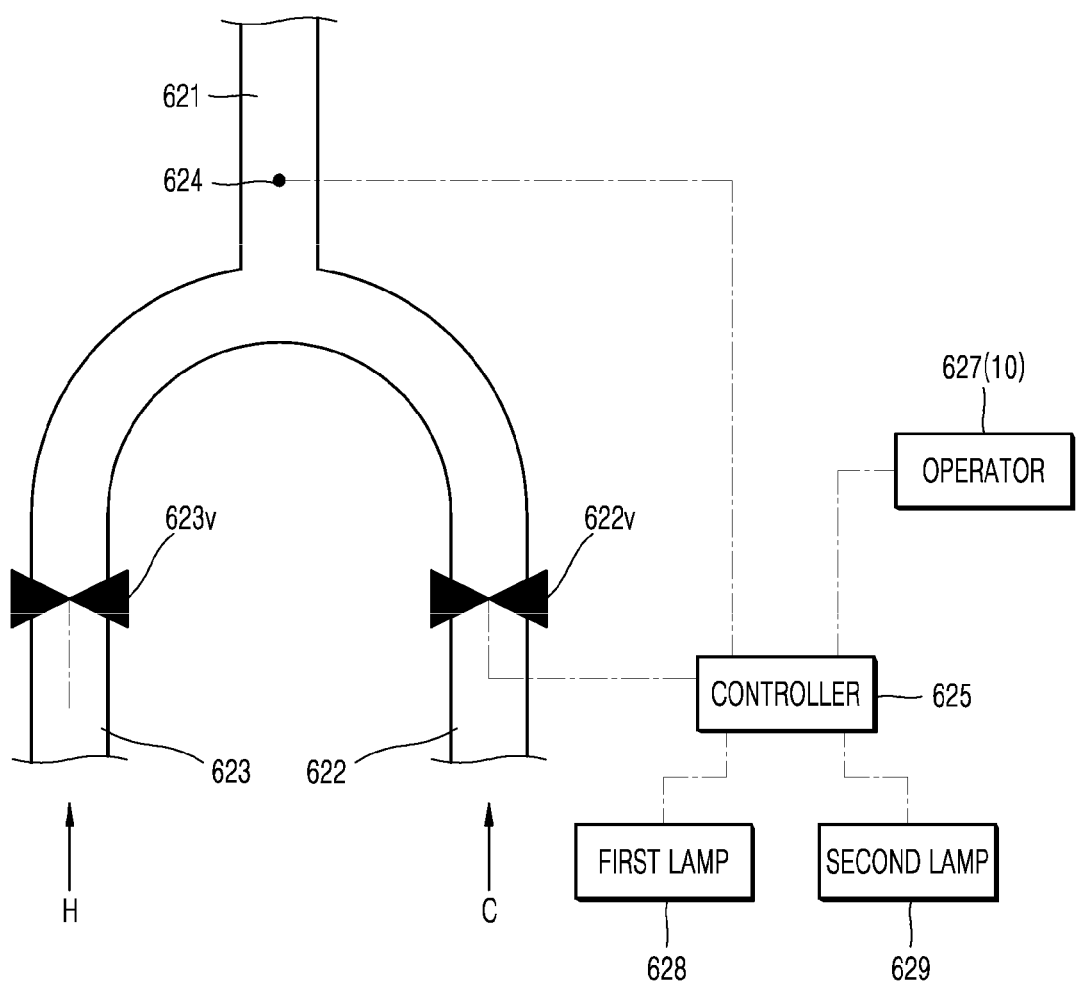
FIG. 23 is a block diagram showing a water supply device of a faucet according to an embodiment of the present disclosure.

FIG. 23 is a block diagram showing a water supply device of a faucet according to an embodiment of the present disclosure.

As shown, according to an embodiment of the present disclosure, a water supply device of a faucet 620 includes a cold water control valve 622*v*, a hot water control valve 623*v*, a temperature sensing sensor 624, an operator 627, a controller 625, a first lamp 628, and a second lamp 629.

The water supply device that may adjust a temperature includes a cold water supply pipe 622 and a hot water supply pipe 623, which are connected to a water discharge pipe 621. Cold water supplied through the cold water supply pipe 622 and hot water supplied through the hot water supply pipe 623 are mixed and discharged through the water discharge pipe 621.

Controlling the temperature of the discharged water is determined based on a mixing ratio of the cold water to the hot water. For example, the case in which the temperature of the hot water supplied to the hot water supply pipe 623 is 60 Celsius degrees and the temperature of the cold water supplied to the cold water supply pipe 622 is 20 Celsius degrees is described.

In some cases where only cold water is discharged, water of 20 Celsius degrees is discharged. In some cases where only hot water is discharged, water of 60 Celsius degrees is discharged. If the cold water and the hot water are mixed at a ratio of 1:1, water of 40 Celsius degrees is discharged.

According to an embodiment of the present disclosure, the water supply device of the faucet 620 includes the cold water control valve 622*v* that adjusts the amount of cold water supplied to the cold water supply pipe 622 and the hot water control valve 623*v* that adjust the amount of hot water supplied to the hot water supply pipe 623.

The opening rate of each of the cold water control valve 622*v* and the hot water control valve 623*v* may be controlled by a controller 625. Accordingly, the opening rate of each of the cold water control valve 622*v* and the hot water control valve 623*v* may be adjusted based on electric signals. By adjusting the opening rates, a flow rate of the discharged water and a mixing ratio of the cold water to the hot water may be adjusted.

For example, a plurality of solenoid valves are provided and a number of open solenoid valves may be adjusted, but are not limited thereto.

An operator 627 functions to receive, from a user, information on an amount of water discharged and a temperature of discharged water. In the case of mechanical faucets, opening and closing of the valve is directly adjusted using the lever. In this embodiment, the operator 627 may be configured as an input switch.

For example, the operator 627 may include a water discharge amount input switch and a temperature input switch, which may be integrated into a jog dial type switch. The jog dial type operation switch 10 mentioned above may also be used as the operator.

When the jog dial type switch is used, the temperature or the amount of discharged water may be adjusted by rotating in a leftward or rightward direction, thereby improving user convenience in operation.

According to the present disclosure, the faucet 620 includes a temperature sensing sensor 624 that may measure the temperature of the water discharged through the water discharge pipe 621 in real time. Information on the temperature of the water detected by the temperature sensing sensor 624 is transmitted to the controller 625 in real time.

The controller 625 receives information on the water discharge amount and the set temperature through the operator 627 and receives information on the temperature (hereinafter, measured temperature) of the discharged water, which is measured by the temperature sensing sensor 624.

The controller 625 receives the information on the water discharge amount, the set temperature, and the measured temperature and controls the operation of the cold water control valve 622*v*, the hot water control valve 623*v*, the first lamp 628, and the second lamp 629.

In more detail, the controller 625 stores information on the cold water temperature supplied through the cold water supply pipe 622 and the hot water temperature supplied through the hot water supply pipe 623.

Cold water temperature is room temperature water supplied through a water pipe, so the temperature changes depending on the season, but the difference is not greater. Therefore, an average temperature of water supplied through the water pipe may be stored as cold water temperature.

Further, as the hot water is supplied through hot water pipes of boilers, water heaters, or district heating corporations, information on the temperature of the hot water discharged and supplied from the water supply pipe suitable for an installation environment may be stored.

As the controller 625 has the information on the cold water temperature and the hot water temperature, when the set temperature is input to the operator 627, the controller 625 may derive the opening ratio of each of the cold water control valve 622*v* and the hot water control valve 623*v* to discharge the water at the set temperature.

The controller 625 may also derive the opening ratio of the valve from the set amount of discharged water input to the operator 627.

For example, the controller 625 derives the opening ratios of the cold water control valve 622*v* and the hot water control valve 623*v* from the amount of discharged water and the set temperature input to the operator 627, to control the opening of each of the cold water control valve 622v and the hot water control valve 623v.

The controller 625 controls the lamp color of each of the first lamp 628 and the second lamp 629. For example, the lamp color of the first lamp 628 may be determined and controlled based on the set temperature and the color of the second lamp 629 may be determined and controlled based on the measurement temperature measured by the temperature sensing sensor 624.

To this end, it is preferable that each of the first lamp 628 and the second lamp 629 includes a light source having two or more colors and may adjust the brightness of each of colors of the light source. The first lamp 628 and the second lamp 629 each preferably includes a blue light source and a red light source such that the user intuitively identifies the temperature.

The blue light source is illuminated at full brightness at a lowest set temperature and the red light source is illuminated at full brightness at a highest set temperature, and mixing of the blue color with the red color may be changed based on the temperature at an intermediate level.

A blue mark is used for the cold water and a red mark is used for the hot water such that users may intuitively identify the temperature based on the ratio of the red color to the blue color of the lamps.

In some cases where the first lamp 628 and the second lamp 629 each include the blue light source and the red light source and the brightness of each of the light sources may be adjusted with 10 levels, the brightness of the blue light source is lowered by one level and the brightness of the red light source is increased by one level when the blue light source is only illuminated at the full brightness, such that 11 of colors of lamp may be combined.

Each of the colors may be displayed with 11 levels based on the temperatures.

Meanwhile, according to the present disclosure, in the water supply device of the faucet 620, the temperature sensing sensor 624 measures the temperature of the water discharged through the water discharge pipe 621 in real time and receives information on the measured value to the controller 625.

Therefore, a difference between the set temperature input to the operator 627 and the measured temperature detected by the temperature sensing sensor may be sensed in real time.

The controller 625 may correct the opening ratios of the cold water control valve 622v and the hot water control valve 623v if the difference between the set temperature and the measured temperature deviates from a preset deviation range even after a predetermined period of time elapses.

For example, even after a period of time during which the hot water may be normally supplied through the hot water supply pipe 623, if the measured temperature is lower than the set temperature of the discharged water, the opening ratios may be corrected such that the opening ratio of the hot water control valve 623v is increased and the opening ratio of the cold water control valve 622v is reduced.

By contrast, if the temperature measured by the temperature sensing sensor 624 is higher than the set temperature input to the operator 627, the controller 625 may correct the opening ratios such that the controller 625 reduces the opening ratio of the hot water control valve 623v and the opening ratio of the cold water control valve 622v.

Figure 24:
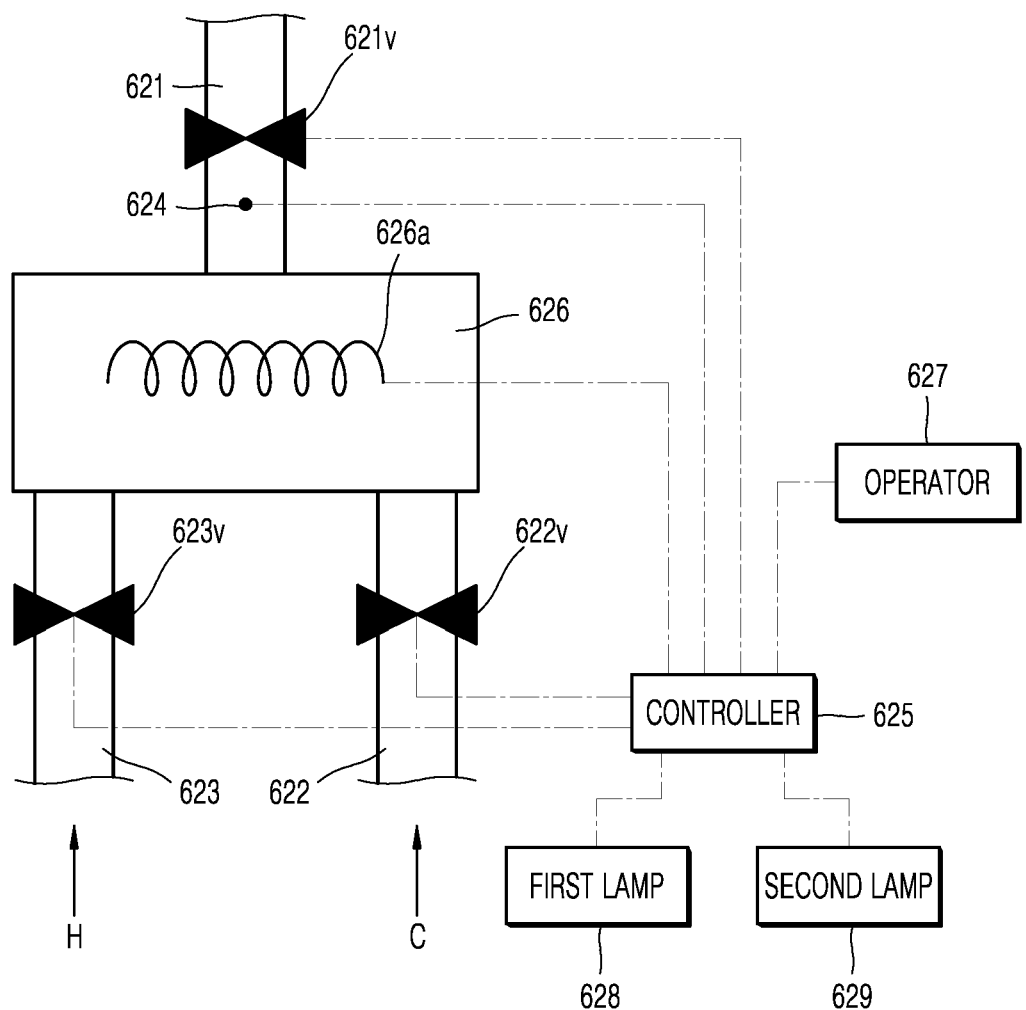
FIG. 24 is a block diagram showing a water supply device according to another embodiment of the present disclosure.

FIG. 24 is a block diagram showing a water supply device according to another embodiment of the present disclosure.

As shown, according to another embodiment of the present disclosure, a water supply device 620' includes a cold water control valve 622v, a hot water control valve 623v, a temperature sensing sensor 624, an operator 627, a controller 625, a first lamp 628, and a second lamp 629, similar to the above described embodiment, and further includes a buffer tank 626, a heater 626a, and a water discharge control valve 621v.

In the above-described embodiment, the cold water supply pipe 622 and the hot water supply pipe 623 are directly connected to the water discharge pipe 621, but in this embodiment, a cold water supply pipe 622 and a hot water supply pipe 623 are connected to a water discharge pipe 621 via the buffer tank 626.

This configuration allows the cold water and the hot water to be mixed in the buffer tank 626 and to heat the water stored in the buffer tank 626 by an additional heater 626a.

Further, in the present embodiment, the water supply device 620' further includes a water discharge control valve 621v that controls opening and closing of the water discharge pipe 621 and an opening degree of the water discharge control valve 621v, similar to the cold water supply pipe 622 or hot water supply pipe 623, may be desirable to be controlled by the controller 625.

In this configuration, even if the cold water control valve 622v and the hot water control valve 623v are opened, the water is not discharged when the water discharge control valve 621v is closed.

When the additional water discharge control valve 621v is provided, the mixing ratio of cold water to hot water determined based on the set temperature is adjusted based on the opening ratio of the cold water control valve 622v and the hot water control valve 623v, and the water discharge amount is adjusted using the water discharge control valve 621v.

Therefore, the temperature control and controlling an amount of discharged water may be performed more accurately.

In this embodiment, the temperature sensing sensor 624 may measure the temperature of the water stored in the buffer tank 626 even before the water is discharged. The temperature sensing sensor 624 is disposed upstream than the water discharge control valve 621v as shown, the water may be filled in a portion at which the temperature sensing sensor 624 is disposed and the water is discharged only when the water discharge control valve 621v is opened.

Therefore, even if the controller 625 receives information on the amount of discharged water and the set temperature, when the measured temperature detected by the temperature sensing sensor 624 is equal to or less than the preset temperature value than the set temperature, the controller 625 may operate the heater 626a disposed in the buffer tank 626 to heat the water in the buffer tank 626.

When the water inside the buffer tank 626 is heated such that the set temperature is close to the preset temperature value, the water discharge control valve 621v may be opened based on the amount of water discharged.

This configuration results in an effect of allowing the water having a temperature similar to the set temperature to be discharged from the beginning when the user sets the hot water to be discharged.

Figure 25:
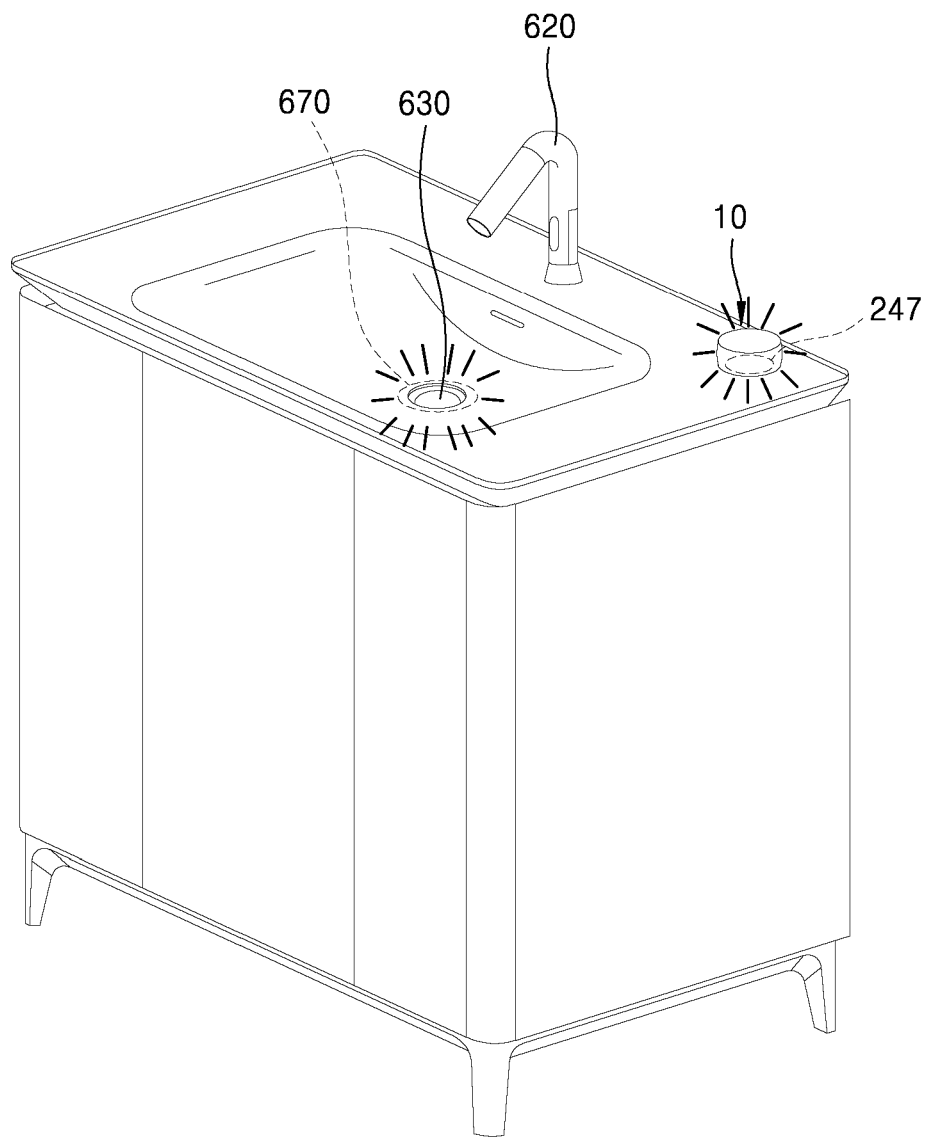
FIG. 25 is a perspective schematic view showing a sink cabinet device that uses a water supply device of a faucet according to an embodiment of the present disclosure.

FIG. 25 is a perspective schematic view showing a sink cabinet device that uses a water supply device of a faucet according to an embodiment of the present disclosure.

As shown, according to an embodiment of the present disclosure, a bath sink includes a water discharge pipe 621, a drain valve 630, and an operation switch 10. In this embodiment, the operator 627 in FIG. 23 is configured as the dial operation switch 10 described with reference to FIGS. 1 to 12.

A first lamp 628 indicating a temperature set by the operation switch 10 may be integrated with the operation switch 10. For example, the luminous element 247 (see FIG. 9) may function as the first lamp 628.

A second lamp 629 may be disposed around a drain valve 630. The second lamp 629 may function as the light source 670 described with reference to FIG. 20.

In the illustrated embodiment, the operator 627 is implemented as a single jog dial operation switch 10. The operator 627 includes two wheel switches, a first wheel switch receives information on a set temperature, and a second wheel switch may receive information on an amount of discharged water.

In some cases where the single jog dial switch is used, the first lamp may remain illuminated in accordance with the previously input set temperature and the single jog dial switch may receive the information on the amount of discharged water through rotation of the jog dial.

In order to re-enter the set temperature, the jog dial may be rotated while being pressed, or the jog dial may be rotated while the jog dial is pulled out. Further, the water discharge amount input mode or the water output temperature setting mode may be changed based on a number of touches (or presses) of the jog dial.

In this configuration, the user may identify the set temperature based on the color of the first lamp 628 illuminated on the dial operation switch 10 and may identify the temperature of the discharged water based on the color of the second lamp 629 disposed in the drain valve, such that the user may visually identify the temperature of the discharged water.

This structure allows the user to identify the set temperature based on the color of the first lamp 628 illuminated to the dial operation switch 10 and the temperature of the discharged water may be identified based on the color of the second lamp 629, such that the user visually identify the temperature of the water.

For example, even if the users does not touch the water using their hands and does not sense the temperature of the water, the users may identify the difference between the temperature of discharged water and the set temperature.

Although the present disclosure has been described as described above with reference to exemplary drawings, the present disclosure is not limited to the embodiments and drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

What is claimed is:

1. A jog dial type operation switch, comprising:
an upper assembly comprising a display device, an upper substrate connected to the display device and comprising at least one push switch, and an upper body that fixes the display device to the upper substrate;
a wheel assembly comprising a ring gear at a bottom surface thereof and that surrounds a side of the upper assembly; and
a lower assembly comprising a lower body coupled to the upper body and comprising a hollow shaft, and a lower substrate to which an encoder engaged with the ring gear is connected,
wherein the at least one push switch is operated when a movable protrusion provided on a support plate of the upper body is pressed.

2. The jog dial type operation switch of claim 1,
wherein the upper body has a cylindrical outer circumferential plate and
wherein the upper substrate and the lower substrate are accommodated in the outer circumferential plate.

3. The jog dial type operation switch of claim 2,
wherein the upper portion of the outer circumferential plate is inclined downward to outside and
wherein moisture introduced between the wheel assembly and the outer circumferential plate is not introduced into the outer circumferential plate.

4. The jog dial type operation switch of claim 3, wherein the lower body comprises an inner circumferential plate inserted into the outer circumferential plate and a bottom plate that extends from the inner circumferential plate, supports a bottom surface of the outer circumferential plate, and protrudes from an outside of the outer circumferential plate.

5. The jog dial type operation switch of claim 1, wherein the lower assembly comprises an luminous element on the lower substrate and a finishing plate coupled to an outside of the ring gear is made of a light-transmitting material.

6. The jog dial type operation switch of claim 5,
wherein the finishing plate supports a bottom surface of the ring gear and
wherein the ring gear is rotatably coupled between a bottom plate of the lower body and the finishing plate.

7. The jog dial type operation switch of claim 1, wherein a wire connected to each of the upper substrate and the lower substrate is drawn out to the hollow shaft.

8. The jog dial type operation switch of claim 1,
wherein the display device comprises a cover glass, a panel comprising a display panel, and a display housing connected to the cover glass and that receives the panel therebetween, and
wherein the display housing is movably coupled to the upper body.

9. The jog dial type operation switch of claim 8, wherein the display housing is fixed to the upper body by a fastening bolt to penetrate the support plate of the upper body.

10. The jog dial type operation switch of claim 9, wherein an elastic jacket is inserted between the display housing and the support plate.

11. The jog dial type operation switch of claim 10, further comprising an elastic sheet on an upper surface of the support plate.

12. The jog dial type operation switch of claim 10, wherein, when the at least one push switch is pressed, the elastic jacket has a polygonal shape such that that one side thereof is compressed uniformly.

13. A sink cabinet device, comprising:
a bath sink comprising a faucet;
a sink cabinet body disposed below the bath sink and that accommodates a functional module; and
a lamp disposed at one side of an upper end of the sink cabinet body and that controls colors to be changed in association with operation of the functional module,
wherein the lamp is configured to change lamp color based on a temperature of water supplied to a faucet of the sink cabinet device.

14. The sink cabinet device of claim 13, further comprising a heating member disposed at one side of the upper end of the sink cabinet body and that heats and dries water flowing down from the bath sink.

15. A sink cabinet device, comprising:
a bath sink body made of a light-transmitting material;
a faucet connected to the bath sink body and connected to a water pipe;
a connecting pipe disposed a lower portion of the bath sink body and coupled to a drain pipe;
a lamp installation groove defined around the connecting pipe; and
a light source disposed in the lamp installation groove in a circular shape,
wherein the sink cabinet device further comprises a lamp configured to change lamp color based on a temperature of water supplied to the faucet.

16. The sink cabinet device of claim 15, further comprising a lower cover coupled to the lamp installation groove and that protects the light source disposed in the lamp installation groove.

17. The sink cabinet device of claim 16, wherein the lower cover is disposed at a position higher than a lower end of the connecting pipe.

18. The sink cabinet device of claim 15,
wherein the faucet is operated to discharge the water having a preset temperature and
wherein a color or brightness of the light source is adjusted based on a set temperature of the discharged water.

19. A sink cabinet device, comprising:
a bath sink body made of a light-transmitting material;
a faucet connected to the bath sink body and connected to a water pipe;
a connecting pipe disposed at a lower portion of the bath sink body and having a drain pipe coupled thereto;
a lamp installation groove defined around the connecting pipe;
a light source disposed in the lamp installation groove in a circular shape; a drawer type functional module disposed;
an integrated operation switch that operates the functional module; and
an integrated controller operated by the integrated operation switch,
wherein the sink cabinet device further comprises a lamp configured to change lamp color based on a temperature of water supplied to the faucet.

20. The sink cabinet device of claim 13,
wherein the faucet comprises:
a cold water control valve disposed in a cold water supply pipe connected to a water discharge pipe;
a hot water control valve disposed in a hot water supply pipe connected to the water discharge pipe;
a temperature sensing sensor that senses a temperature of the water discharged to the water discharge pipe;
an operator that receives information on a set temperature and a amount of discharged water;
a first lamp comprising light sources having at least two colors and that adjusts the color of the emitted light,
a second lamp comprising light sources having at least two colors and that adjusts the color of the emitted light; and
a controller that controls an opening rate of the cold water control valve and the hot water control valve based on the set temperature input to the operator, controls a color of the first lamp based on the set temperature input to the operator, and controls a color of the second lamp based on the temperature of the discharged water, which is sensed by the temperature sensing sensor.

* * * * *